US010284022B2

(12) United States Patent
Kim et al.

(10) Patent No.: US 10,284,022 B2
(45) Date of Patent: *May 7, 2019

(54) WIRELESS POWER TRANSMISSION AND RECEPTION SYSTEM

(71) Applicant: SAMSUNG ELECTRONICS CO., LTD., Suwon-si (KR)

(72) Inventors: Nam Yun Kim, Seoul (KR); Sang Wook Kwon, Seongnam-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 225 days.

This patent is subject to a terminal disclaimer.

(21) Appl. No.: 15/355,513

(22) Filed: Nov. 18, 2016

(65) Prior Publication Data

US 2017/0070103 A1 Mar. 9, 2017

Related U.S. Application Data

(63) Continuation of application No. 13/453,436, filed on Apr. 23, 2012, now Pat. No. 9,502,925.

(30) Foreign Application Priority Data

May 4, 2011 (KR) .................. 10-2011-0042557

(51) Int. Cl.
 *H02J 7/00* (2006.01)
 *H02J 7/02* (2016.01)
 (Continued)

(52) U.S. Cl.
 CPC ............ *H02J 50/40* (2016.02); *H02J 7/0004* (2013.01); *H02J 7/0042* (2013.01); *H02J 7/025* (2013.01);
 (Continued)

(58) Field of Classification Search
 CPC .......... H02J 17/00; H02J 50/12; H02J 7/0004; H02J 50/40; H02J 7/025; H02J 50/80; H02J 7/0042
 See application file for complete search history.

(56) References Cited

U.S. PATENT DOCUMENTS 4,275,385 A 6/1981 White
8,629,650 B2 1/2014 Mohammadian et al.
(Continued)

FOREIGN PATENT DOCUMENTS

JP 2006-34044 2/2006
JP 2009-247124 10/2009
(Continued)

OTHER PUBLICATIONS

Korean Office Action dated Feb. 28, 2017 in corresponding Korean Patent Application No. 10-2011-0042557 (12 pages with English translation).

*Primary Examiner* — Jared Fureman
*Assistant Examiner* — Duc M Pham
(74) *Attorney, Agent, or Firm* — Sughrue Mion, PLLC

(57) ABSTRACT

A wireless power transmission method and a wireless power transmitter are provided that may selectively transmit wireless power to a plurality of target devices. According to an aspect, a wireless power transmitter may include: a detecting unit configured to detect a plurality of target devices; a controller configured to determine a plurality of resonance frequencies between a source resonator and the plurality of detected target devices and to control the plurality of resonance frequencies to transmit the power to the plurality of detected target devices; and a source resonance unit configured to transmit the power to the plurality of detected target devices.

20 Claims, 23 Drawing Sheets

(51) Int. Cl.
*H02J 50/12* (2016.01)
*H02J 50/40* (2016.01)
*H02J 50/80* (2016.01)
*H02J 17/00* (2006.01)

(52) U.S. Cl.
CPC .............. *H02J 17/00* (2013.01); *H02J 50/12* (2016.02); *H02J 50/80* (2016.02)

(56) References Cited

U.S. PATENT DOCUMENTS

| | | |
|---|---|---|
| 9,502,925 B2 * | 11/2016 | Kim .................. H02J 17/00 |
| 2008/0025341 A1 | 1/2008 | Rao et al. |
| 2009/0284218 A1 | 11/2009 | Mohammadian et al. |
| 2010/0033021 A1 | 2/2010 | Bennett |
| 2010/0036773 A1 | 2/2010 | Bennett |
| 2011/0080051 A1 | 4/2011 | Lee et al. |
| 2011/0244913 A1 | 10/2011 | Kim et al. |
| 2012/0001485 A1 | 1/2012 | Uchida |
| 2014/0285008 A1 | 9/2014 | Azancot et al. |

FOREIGN PATENT DOCUMENTS

| | | |
|---|---|---|
| JP | 2010-051137 A | 3/2010 |
| KR | 10-2005-0105200 A | 11/2005 |
| KR | 10-2008-0106186 A | 12/2008 |
| KR | 10-2009-0131746 A | 12/2009 |
| KR | 10-2011-00379999 A | 4/2011 |
| WO | WO 98/34319 A1 | 8/1998 |

* cited by examiner

WIRELESS POWER TRANSMISSION AND RECEPTION SYSTEM

CROSS-REFERENCE TO RELATED APPLICATION(S)

This application is a continuation of U.S. patent application Ser. No. 13/453,436 filed on Apr. 23, 2012, which claims the benefit under 35 U.S.C. § 119(a) of Korean Patent Application No. 10-2011-0042557, filed on May 4, 2011, in the Korean Intellectual Property Office, the entire disclosure of which is incorporated herein by reference for all purposes.

BACKGROUND

1. Field

The following description relates to wireless power transmission and reception.

2. Description of Related Art

As demand for portable electrical devices has rapidly increased, use of wired power supplies for these devices has generally become more inconvenient. Studies on wireless power transmission have been conducted to overcome inconveniences of wired power supplies and the limited capacity of conventional batteries. One conventional wireless power transmission technology may use a resonance characteristic of radio frequency (RF) devices which include a source that supplies power and a target that receives power.

SUMMARY

According to one general aspect, a wireless power transmitter may include: a detecting unit configured to detect a plurality of target devices; a controller configured to determine a plurality of resonance frequencies between a source resonator and the plurality of detected target devices and to control the plurality of resonance frequencies to transmit the power to the plurality of detected target devices; and a source resonance unit configured to transmit the power to the plurality of detected target devices.

The controller may be configured to determine the plurality of resonance frequencies based on one or more coupling factors between the source resonator and the plurality of target resonators.

The controller may be configured to control the plurality of resonance frequencies that matches the plurality of detected target devices, to be used sequentially.

The controller may be configured to control a duty cycle corresponding to a transmission period of the power, based on state information associated with the plurality of detected target devices.

The controller may be configured to transmit the power by setting an initial resonance frequency in a predetermined range corresponding to each of the plurality of detected target devices, and to receive information associated with wireless power transmission efficiency from a target device that receives the power so as to variably determine an optimal resonance frequency.

The controller may be configured to determine the plurality of resonance frequencies corresponding to the source resonance and the plurality of target resonances, respectively, by controlling the impedance of the source resonator to control or optimize wireless power transmission efficiency.

The controller may be configured to calculate wireless power transmission efficiency based on the power transmitted from the source resonator and power received by the plurality of detected target devices.

The controller may be configured to calculate wireless power transmission efficiency based on the power transmitted from the source resonator and power reflected from the plurality of detected target devices.

The wireless power transmitter may further include: a communication unit configured to receive, from the plurality of detected target devices, a response signal corresponding to wake-up signal, identifications (IDs) of target resonators included in the plurality of detected target devices, IDs of the plurality of detected target devices, state information associated with the plurality of detected target devices, or any combination thereof.

The communication unit may be configured to obtain, from the plurality of detected target devices, information for impedance matching between the source resonator and the plurality of detected target devices, and information for calculating wireless power transmission efficiency, through in-band communication or out-band communication.

The wireless power transmitter may further include: a power converting unit configured to convert DC power of a predetermined level to AC power for the power based on a predetermined switching pulse signal.

The detecting unit may be configured to generate a wake-up signal that awakens a plurality of target devices and to detect a plurality of target devices based on a response signal in response to the wake-up signal.

The source resonance unit may be configured to sequentially transmit the power to the plurality of detected target devices.

According to another general aspect, a wireless power receiver may include: a target resonance unit configured to receive power from a source resonator; and a controller configured to determine a resonance frequency between the source resonator and a target device.

The target resonance unit may be configured to receive, from the source resonator, the power during a predetermined duty cycle.

The controller may be configured to control the resonance frequency between the source resonator and the target device by controlling the impedance of the target device, based on transmission efficiency of the power.

The target resonance unit may be configured to receive a wake-up signal from the source resonator; and the wireless power receiver may further include: a communication unit configured to transmit a response signal corresponding to the wake-up signal, a charging request signal, an identification (ID) of an awakened target device, state information associated with the awakened target device, or any combination thereof.

According to yet another general aspect, a wireless power transmission method may include: detecting a plurality of target devices; determining a plurality of resonance frequencies between a source resonator and the plurality of detected target devices; controlling the plurality of resonance frequencies to transmit power to the plurality of detected target devices; and transmitting the power to the plurality of detected target devices.

The determining may include: determining the plurality of resonance frequencies, based on distances between the source resonator and the plurality of target resonators, resonance impedances, impedance mismatching, locations of the plurality of target resonators on the source resonator, or any combination thereof.

The controlling may include: controlling the plurality of resonance frequencies that matches the plurality of detected target devices, to be used sequentially.

The controlling may include: controlling a duty cycle corresponding to a transmission period of the power, based on state information associated with the plurality of detected target devices.

The determining may include: transmitting the power by setting an initial resonance frequency in a predetermined range corresponding to each of the plurality of detected target devices, and receiving information associated with wireless power transmission efficiency from a target device that receives the power so as to variably determine an optimal resonance frequency.

The method may further include: receiving, from the plurality of detected target devices, a response signal corresponding to the wake-up signal, identifications (IDs) of target resonators included in the plurality of detected target devices, IDs of the plurality of target devices, state information associated with the plurality of target devices, or any combination thereof.

The detecting a plurality of target devices may include receiving a response signal corresponding to a wake-up signal that awakens the plurality of target devices.

According to a further general aspect, a wireless power reception method may include: receiving power from a source resonator; and determining a resonance frequency between the source resonator and a target device.

The receiving may include: receiving, from the source resonator, the power during a predetermined duty cycle.

The determining may include: determining the resonance frequency between the source resonator and the target device, based on transmission efficiency of the power.

The method may further include: receiving, from the source resonator, a wake-up signal; transmitting a response signal corresponding to the wake-up signal, a charging request signal, an identification (ID) of an awakened target device, state information associated with the awakened target device, or any combination thereof.

Other features and aspects may be apparent from the following detailed description, the drawings, and the claims.

Figure 1:
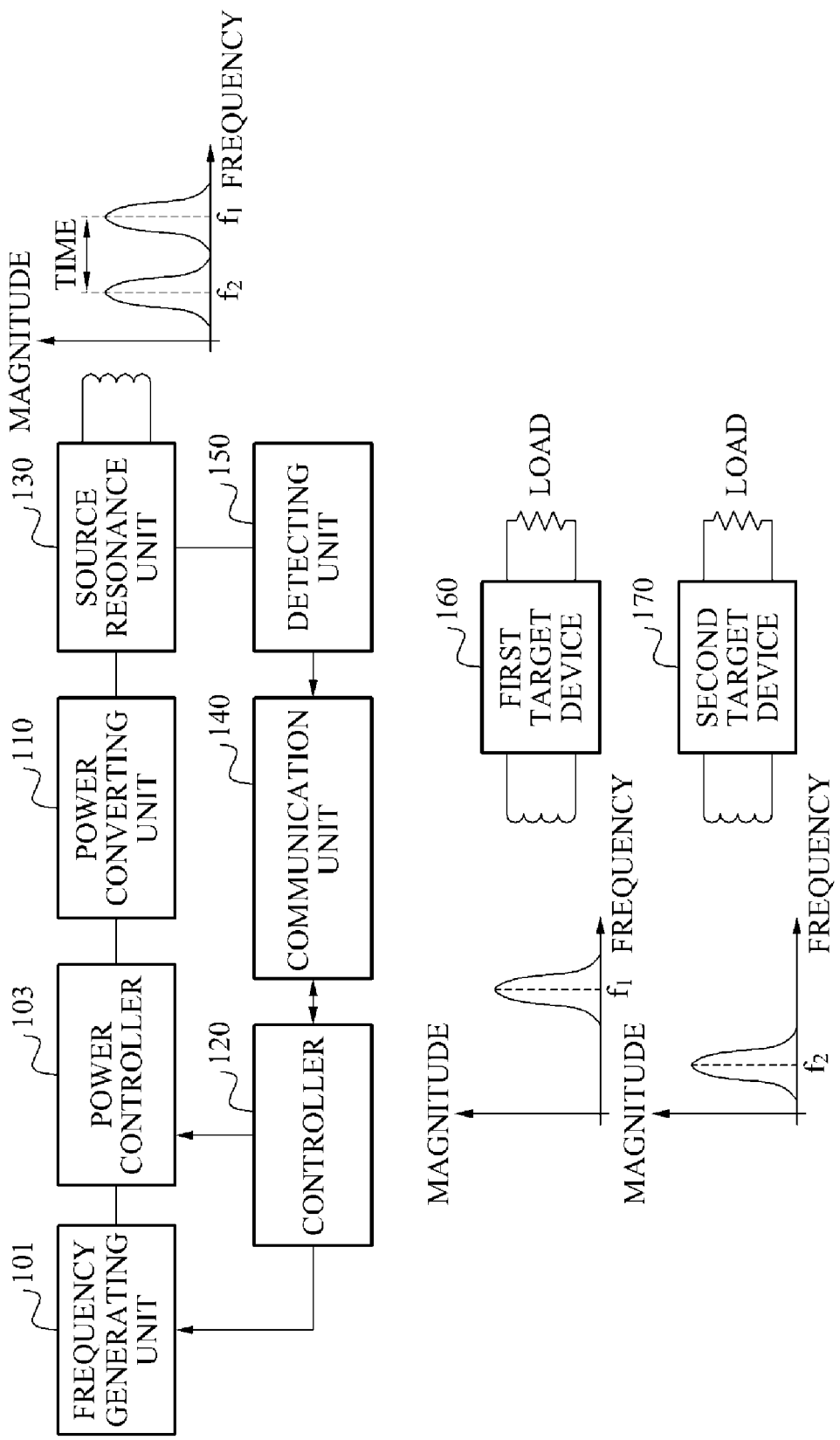
FIG. 1 is a block diagram illustrating a wireless power transmitter.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 illustrates a wireless power transmitter.

As shown, the wireless power transmitter may include a frequency generating unit 101, a power controller 103, a power converting unit 110, a controller 120, a source resonance unit 130, a communication unit 140, and a detecting unit 150. The wireless power transmitter may transmit power to a first target device 160 and a second target device 170, for instance.

The frequency generating unit 101 may generate a resonance frequency based on a resonance frequency determined by the controller 120, so that a source resonator and a target resonator operate using the generated resonance frequency. The power controller 103 may control power transferred from the wireless power transmitter to a wireless power receiver. The power controller 103 may be configured to control the maximum amplitude of a transmitted alternating current (AC) power, for instance.

The power converting unit 110 may convert direct current (DC) power of a predetermined level to AC power based on a predetermined switching pulse signal. For example, the predetermined switching pulse signal may be generated by the power controller 103. The power converting unit 110 may include a DC/AC inverter, in some instances. The DC/AC inverter may generate wireless power by converting a DC signal of a predetermined level to an AC signal. The DC/AC inverter may be configured to include a switching device for quick switching. For example, the switching device may be turned ON when a switching pulse signal is high (e.g., at or near its maximum), and may be turned OFF when a switching pulse signal is low (e.g., at or near its minimum). The DC/AC inverter may be configured to generate an AC signal (e.g., in a band of a few megahertz (MHz) to tens of MHz by quickly switching a DC signal. Other frequencies of AC power are also possible. The power converting unit 110 may be configured to include a power amplifier that is configured to amplify the AC signal.

The power converting unit 110 may be configured to include an AC/AC converter and an AC/DC converter. The AC/AC converter may adjust a signal level of a DC signal inputted from an external device to a desired level, and the AC/DC converter may rectify an AC signal outputted from the AC/AC converter and may output a DC voltage of a predetermined level.

The controller 120 may be configured to determine a plurality of resonance frequencies between a source resonator and a plurality of detected target devices. The controller 120 may determine the plurality of resonance frequencies based on coupling factors between the source resonator and the plurality of detected target devices.

A resonance frequency that causes a magnetic coupling between a source resonator and a target resonator may be determined based on a unique resonance frequency of the source resonator, a unique resonance frequency of the target resonator, and coupling factors. The coupling factors may include a distance between the source resonator and the target resonator, resonance impedance, a mutual inductance, and/or the like.

When a plurality of target devices including target resonators exists, a plurality of resonance frequencies may exist between the plurality of target devices and the source resonator. For example, the plurality of resonance frequencies between the respective target devices and the source resonator may be different from each other. In some instances, resonance frequencies between a predetermined group of target devices and the source resonator may be the same.

The controller 120 may control the plurality of resonance frequencies to transmit AC power to the plurality of target devices detected by the detecting unit 150. In one or more embodiments, the AC power may be sequentially transmitted to the plurality of detected target devices. The controller 120 may control duty time of the plurality of resonance frequencies having different values. When the plurality of resonance frequencies between the source resonator and the target devices are different from each other, the controller 120 may control the AC power to be transmitted to a target device that matches a resonance frequency in a duty time corresponding to the resonance frequency.

The controller 120 may include a multiplexer that is configured to output a single resonance frequency among a plurality of resonance frequencies at a predetermined time. The controller 120 may set resonance frequencies corresponding to predetermined times, respectively. For example, the multiplexer may be configured output a resonance frequency corresponding to a predetermined time, using the predetermined time as a selection signal.

The controller 120 may control the plurality of resonance frequencies that matches the plurality of detected target devices to be used sequentially, for instance. When a resonance frequency between the source resonator and a first target device 160 is $f_1$, and a resonance frequency between the source resonator and a second target device 170 is $f_2$, the controller 120 controls $f_1$ and $f_2$ to be used sequentially. The controller 120 may transmit AC power to the first target device 160 using $f_1$, and subsequently, may transmit AC power to the second target device 170 using $f_2$. The controller 120 may control duty times of $f_1$ and $f_2$ so that power transmitted to the first target device 160 and the second target device 170 may be controlled.

The controller 120 may determine the plurality of resonance frequencies based on distances between the source resonator and the plurality of target resonators, resonance impedances, impedance mismatching, and locations of the plurality of target resonators on the source resonator. Coupling factors may be determined based on the distance between the source resonator and the plurality of target resonators, resonance impedances, impedance mismatching, and locations of the plurality of target resonators on the source resonator. For example, when the source resonator is a pad type, a resonance frequency may be determined based on a distance between the source resonator and a target resonator located on the source resonator.

The controller 120 may distribute a predetermined AC power based on a time so as to transmit the predetermined AC power to a plurality of target devices. Thus, multiple device may be charged (e.g., at the same time). When multiple devices are charged by distributing a relatively smaller amount of AC power, power loss due to a high frequency may be reduced in the wireless power transmitter.

The controller 120 may variably control a duty cycle, based on state information associated with the plurality of detected target devices. The duty cycle may denote a period for transmitting AC power to a target device. State information associated the target device may include a charging level of the target device, a load suddenly applied to the target device, a power request from a user, and/or the like.

The controller 120 may increase a value of the duty cycle to quickly transmit the AC power to a target device during a predetermined period of time. The duty cycle may denote a ratio of a time for transmitting AC power to a predetermined target device to a period of time for transmitting AC power to a plurality of target devices. The controller 120 may increase the time for transmitting AC power to the predetermined target device so as to increase the duty cycle.

The controller 120 may transmit AC power by setting an initial resonance frequency in a predetermined range according to each of the plurality of detected target devices, and may receive information associated with wireless power transmission efficiency from a target device that receives the AC power and thus, may adaptively determine an optimal resonance frequency. For example, the initial resonance frequency may be determined in a resonance bandwidth between a source resonator and a target device. In addition, the controller 120 may determine a resonance frequency when the wireless power transmission efficiency has a peak value, as the optimal resonance frequency. The information associated with the wireless power transmission efficiency may be received by the communication unit 140.

The source resonance unit 130 may transmit AC power to the plurality of detected target devices, through a magnetic coupling between the source resonator and the plurality of target resonators. This may be in a sequential manner. For example, the source resonator 130 may sequentially transmit AC power based on duty times of a plurality of resonance frequencies determined by the controller 120.

For example, the source resonance unit 130 may transfer electromagnetic energy to a target resonator. The source resonance unit 130 may transfer wireless power to a target device through a magnetic coupling between the source resonator and the target resonator. In various embodiments, the source resonator may resonate within a resonance bandwidth.

The communication unit 140 may receive, from a plurality of target devices, a response signal corresponding to a wake-up signal, identifications (IDs) of target resonators included in the plurality of target devices, IDs of the plurality of target devices, state information associated with the plurality of target devices, or any combination thereof. The communication unit 140 may transmit, to a target device, a signal that requests information associated with received power, and a signal including information associated with a frequency set between the source resonator and the target resonator and information associated with power transmitted from the source resonance unit 130

The communication unit 140 may obtain, from the plurality of target devices, information for impedance matching between the source resonator and the plurality of target devices and information for calculating wireless power transmission efficiency, through in-band communication or out-band communication.

The term "in-band" communication(s), as used herein, means communication(s) in which information (such as, for example, control information, data and/or metadata) is transmitted in the same frequency band, and/or on the same channel, as used for power transmission. According to one or more embodiments, the frequency may be a resonance frequency. And, the term "out-band" communication(s), as used herein, means communication(s) in which information (such as, for example, control information, data and/or metadata) is transmitted in a separate frequency band and/or using a separate or dedicated channel, than used for power transmission. The information for impedance matching may include a distance between the source resonator and the target resonator, a difference in load impedance, a reflection coefficient of a wave radiated from the source resonator to the target resonator, a power transmission gain, coupling efficiency, and/or the like. The in-band communication may denote transmission and reception of data with a target device using a resonance frequency, and an out-band communication may denote transmission and reception of data with a target device using a frequency allocated for data communication.

The information for calculating the wireless power transmission efficiency may denote information associated with power transmitted from the source resonator, power received by the target resonator, and power reflected by the target resonator.

The detecting unit 150 may be configured to generate a wake-up signal that awakens a plurality of target devices using AC power. The detecting unit 150 may detect the plurality of target devices based on a response signal corresponding to the wake-up signal. In some embodiments, the detecting unit 150 may sense a location of a target device using a pressure sensor.

The detecting portion 150 may detect power transmitted from source resonator 130.

In one or more embodiments, the source resonator and the target resonator may be configured as a helix coil structured resonator, a spiral coil structured resonator, a meta-structured resonator, or the like.

For instance, the source resonator and the target resonator may be a resonator to be described with reference to FIGS. 10 through 16, and power may be wirelessly transmitted through a signal wave propagated by the source resonator.

In some instances, impedance mismatching between the source resonator and the target resonator may occur due to an external factor, such as a change in a distance between the source resonator and the target resonator, a change in a location of the source resonator or the target resonator. The impedance mismatching may be a direct factor that reduces efficiency in power transmission. The controlling unit 120 may determine that the impedance mismatching occurs by sensing a reflected wave corresponding to a portion of a transmission signal, and may perform an impedance matching. The controlling unit 120 may detect a resonance point by analyzing a waveform of the reflected wave, and may change a resonance frequency. The controller 120 may determine a frequency having the minimum amplitude in the waveform of the reflected wave, as the resonance frequency.

Figure 2:
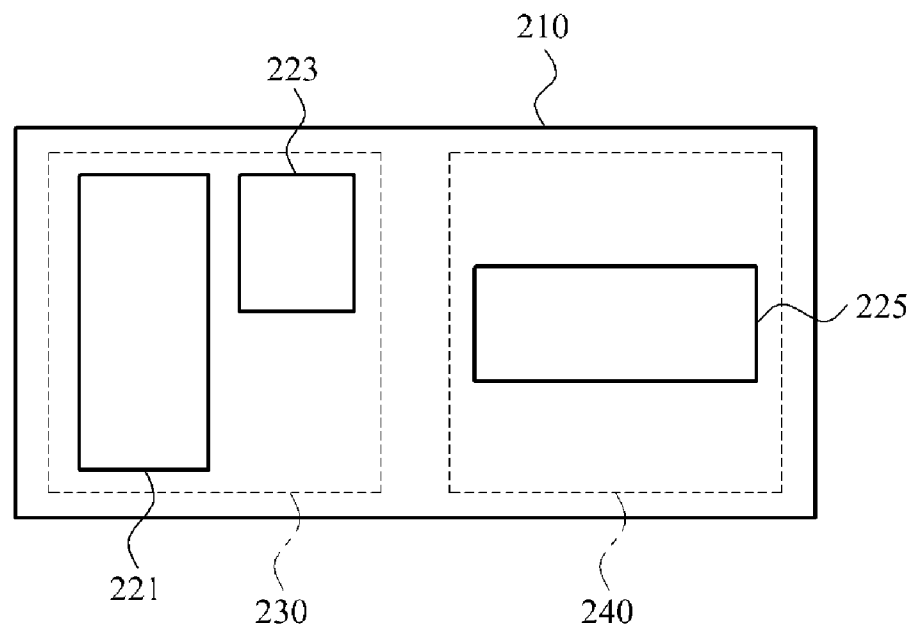
FIG. 2 is a diagram illustrating a method of determining a plurality of resonance frequencies.

FIG. 2 illustrates a method of determining a plurality of resonance frequencies.

Referring to FIG. 2, target resonators 221, 223, and 225 are located on a source resonator 210. In one or more embodiments, the source resonator 210 may be a pad type resonator, which is generally configured as a pad which devices may rest upon during charging.

The controller 120 of the wireless power transmitter may determine a resonance frequency based on a unique resonance frequency of a source resonator 210, and a unique resonance frequency of a target resonator, for example, the target resonators 221, 223, and 225, and a distance between the source resonator 210 and the target resonator, a resonance impedance, impedance mismatching, and a location of the target resonator on the source resonator 210.

When the target resonators 221, 223, and 225 are located on the source resonator 210, the controller 120 may determine the resonance frequency between the source resonator 210 and the target resonator 221, the resonance frequency between the source resonator 210 and the target resonator 223, and the resonance frequency between the source resonator and the target resonator 225.

The three resonance frequencies may have different values, for instance, based on the locations of the target resonators 221, 223, and 225 on the source resonator 210. Also, the three resonance frequencies may have difference values based on distances between the source resonator 210 and the target resonators 221, 223, and 225.

In an area 230, the target resonator 221 and the target resonator 223 may have the same resonance frequency. The target resonator 225 in an area 240 may have a different resonance frequency from the target resonator 221 and the target resonator 223.

Figure 3:
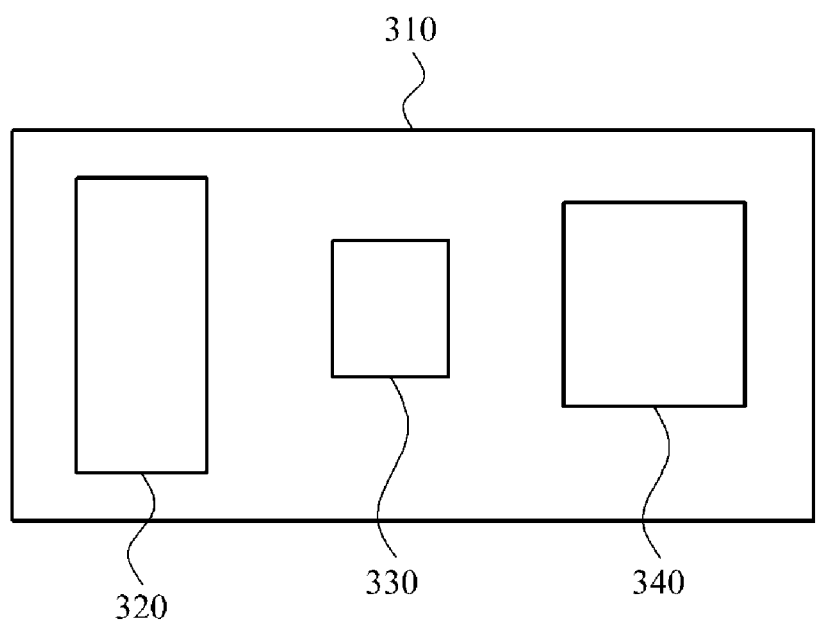
FIG. 3 is a diagram illustrating another method of determining a plurality of resonance frequencies.

FIG. 3 illustrates another method of determining a plurality of resonance frequencies.

Referring to FIG. 3, target devices 320, 330, and 340 are located on a source resonator 310. In one or more embodiments, the source resonator 310 may be a pad type.

The controller 120 of the wireless power transmitter may set an initial resonance frequency in a predetermined range corresponding to the target device 320, and may transmit AC power. An ID and location information associated with the target device 320 may be obtained through the communication unit 240. The controller 120 may receive information associated with wireless power transmission efficiency from the target device 320 that receives the AC power, and may adaptively determine an optimal resonance frequency. The controller 120 may determine a resonance frequency when the wireless power transmission efficiency has a peak value, as an optimal resonance frequency. The controller 120 may determine the optimal resonance frequency by changing a resonance frequency within a resonance bandwidth.

In addition, the controller 120 may determine the optimal resonance frequency corresponding to the target device 320. Subsequently, the controller 120 may determine optimal resonance frequencies for the target device 330 and the target device 340. For example, this may be in consecutive order. Of course, other orders or sequences of charging target devices may also be possible.

Figure 4:
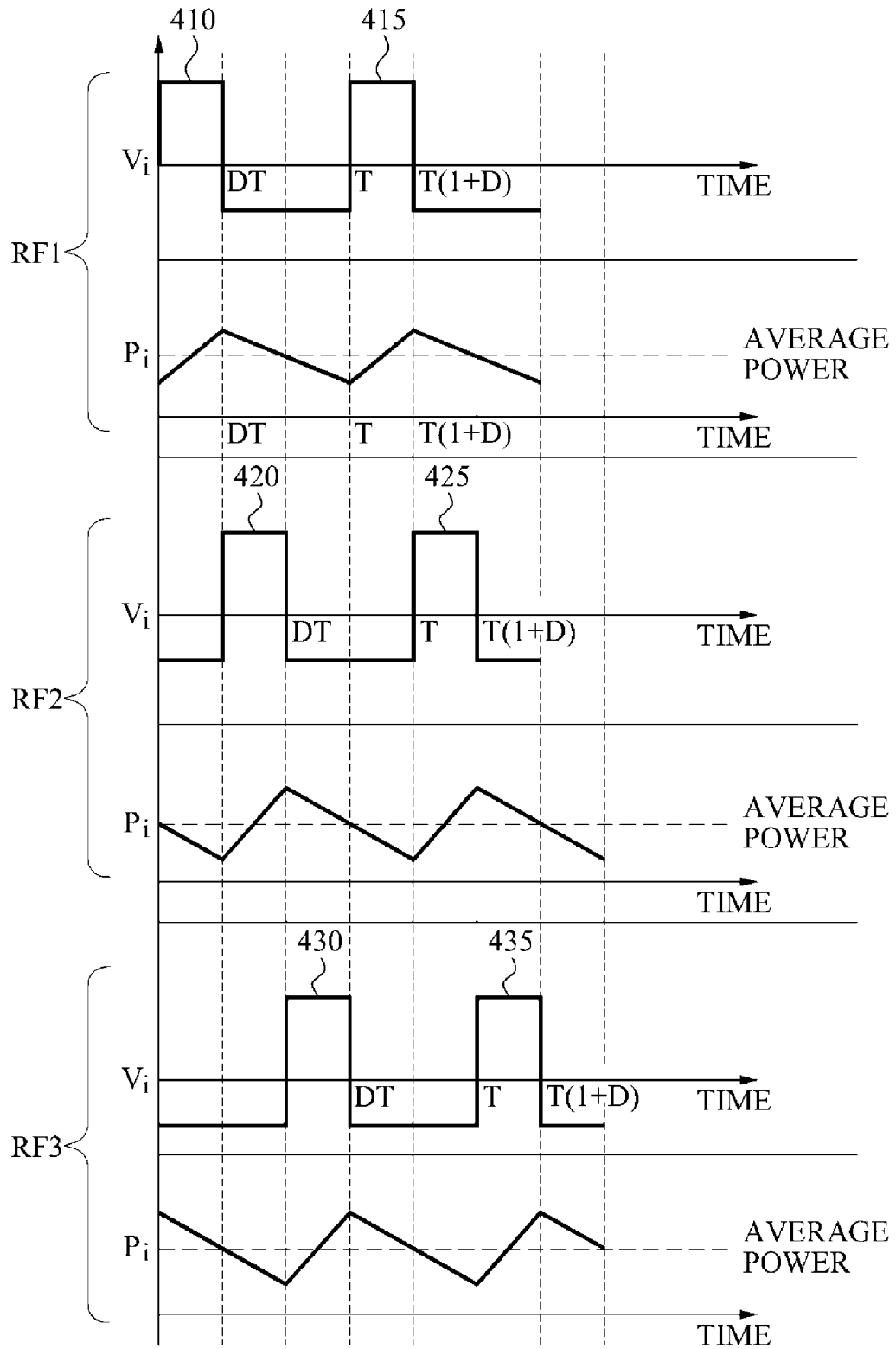
FIG. 4 is a graph illustrating a method of sequentially transmitting wireless power using a plurality of resonance frequencies, respectively.

FIG. 4 illustrates a method of sequentially transmitting wireless power using a plurality of resonance frequencies, respectively.

A wireless power transmitter may transmit, using resonance frequency 1 (RF1), power ($P_i$) to a first target device in a period 410. The $P_i$ transmitted in the period 410 may vary (e.g., increased or decreased). The wireless power transmitter may transmit $P_i$ to a second target device and a third target device using resonance frequency 2 (RF2) and resonance frequency 3 (RF3), respectively, between the period 410 and a period 415. Therefore, $P_i$ may not be transmitted to the first target device between the period 410 and the period 415. The wireless power transmitter may transmit again $P_i$ to the first target device using RF 1.

The period 410 may correspond to a duty time (DT) during which AC power is transmitted using RF1, in some instances. The wireless power transmitter may periodically use RF1, RF2, and RF3 so as to sequentially transmit $P_i$ to the first target device, the second target device, and the third target device. For example, an average of power received by the first target device, the second target device, and the third target device, that is, an average power may be constant.

Similarly, the wireless power transmitter may transmit AC power to the second target device using RF2 in the period 420. $P_i$ transmitted in the period 420 may increase. The wireless power transmitter may transmit $P_i$ to the third target device and the first target device using RF3 and RF1, respectively, between the period 420 and the period 425. Accordingly, AC power may not be transmitted to the second target device between the period 420 and the period 425. The wireless power transmitter may again transmit $P_i$ to the second target device using RF2.

Moreover, the wireless power transmitter may transmit $P_i$ to the third target device using RF3 in the period 430. $P_i$ transmitted in the period 430 may increase. The wireless power transmitter may transmit $P_i$ to the first target device and the second target device using RF1 and RF2, respectively, between the period 430 and the period 435. Accordingly, $P_i$ may not be transmitted to the third target device between the period 430 and the period 435. The wireless power transmitter may transmit again $P_i$ to the third target device using RF3.

Therefore, the wireless power transmitter may sequentially transmit, based on a time, a predetermined amount of initial power to the first target device, the second target device, and the third target device using RF1, RF2, and RF3. Since a predetermined amount of power is periodically distributed based on a time to target devices, power received by respective target devices may decrease. However, an average power may be generally constant.

The wireless power transmitter may transmit wireless power using RF1, RF2, and RF3 matching the first target device, the second target device, and the third target device, respectively, so that the plurality of target devices may be effectively charged.

Figure 5:
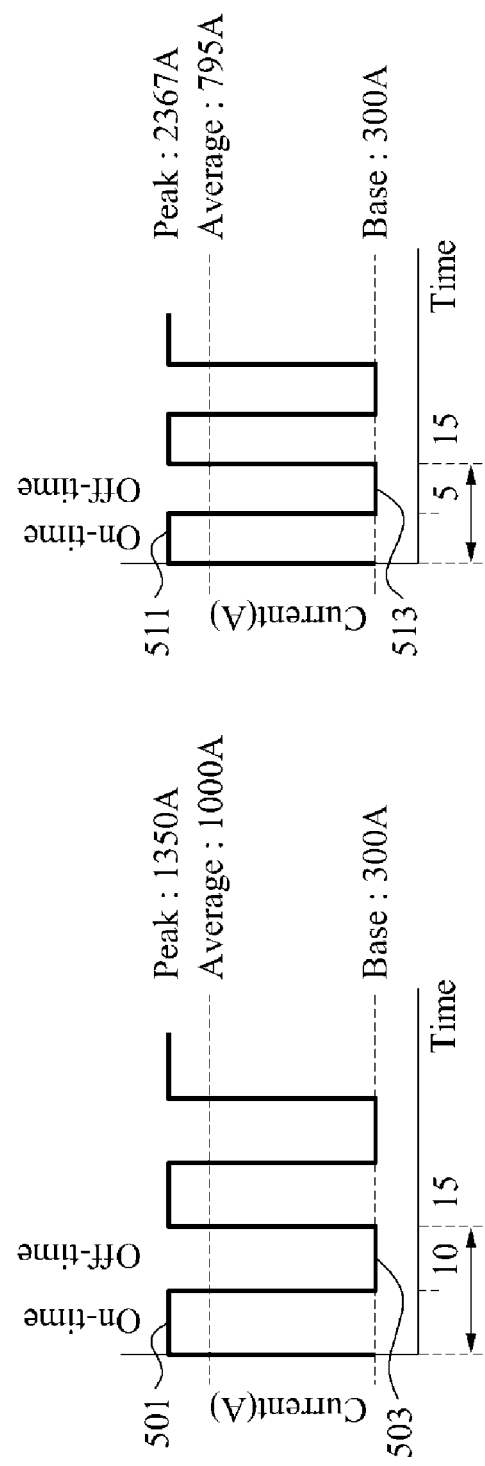
FIG. 5 is a graph illustrating a duty cycle corresponding to a wireless power transmission period.

FIG. 5 illustrates a duty cycle corresponding to a wireless power transmission period.

The duty cycle may denote a ratio of a period in which AC power is actually transmitted in a transmission period of AC power. A period 501 and a period 511 are periods in which AC power is transmitted. The period 501 and the period 511 may be referred to as ON time. A period 503 and a period 513 are periods in which AC power is not transmitted. The period 503 and the period 513 may be referred to as OFF time. In the period 501 and the period 511, a resonance frequency of a target device to be charged matches a resonance frequency of a source resonance. In the period 503 and the period 513, the resonance frequency of the target device to be charged does not match the resonance frequency of the source resonance.

The period 501 corresponds to 10 ms, and the period 503 corresponds to 5 ms. The transmission period of AC power may be 15 ms. Accordingly, the duty cycle may be (10/15)× 100%=66.7%. When a power supply of 1000 A is used, an average current provided by power may be 1000 A. When a base current value flowing through a wireless power transmitter is assumed to be 300 A, the maximum current value of AC power that the wireless power transmitter may transmit may be calculated based on the following equation:

$$\text{Max current value}=(100\times\text{average current value}/\text{duty cycle})-(\text{base current value}\times\text{OFF time}/\text{ON time})$$

Therefore, the maximum current value may be [100× (1000/66.7)]−[300×(5/10)]=1350 A.

The period 511 corresponds to 5 ms and the period 513 corresponds to 10 ms. The transmission period of AC power may be 15 ms. Accordingly, the duty cycle may be (5/15)× 100%=33.3%. When a power supply of 1000 A is used, an average current provided by power may be 1000 A. And when a base current value flowing through the wireless power transmitter is assumed to be 300 A, the maximum current value of AC power that the wireless power transmitter may transmit may be [100×(1000/33.3))−[300×(10/ 5)]=2403 A. The average current value of the AC power that the wireless power transmitter may be calculated based on the following equation.

$$\text{Average current value}=[(\text{duty cycle}\times\text{maximum current value})+(\text{base current value}\times\text{OFF time}/\text{ON time})]/100$$

Accordingly, the average current value may be [(33.3× 2367)+(300×10/5)]/100=795 A.

Therefore, an amount of transmitted AC power may be controlled by adjusting the duty cycle from 66.7% to 33.3%. The wireless power transmitter may variably adjust the duty cycle based on a need of a target device so as to control the amount of AC power. For example, when a target device needs quick charging, the wireless power transmitter may increase the duty cycle so that a greater amount of AC power may be transmitted.

Figure 6:
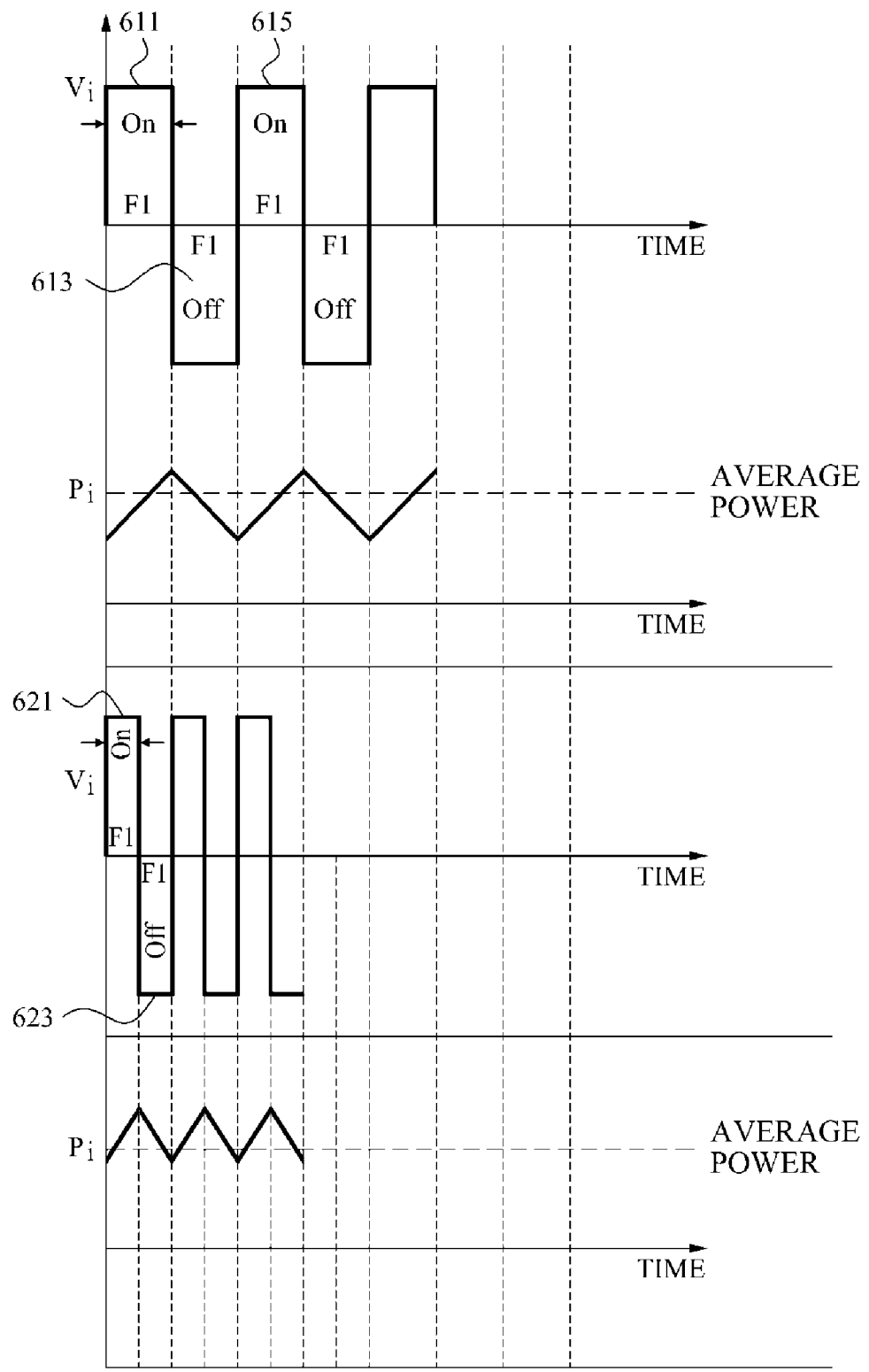
FIG. 6 is a graph illustrating a method of adjusting an amount of a wireless power transmission by variably controlling a duty cycle.

FIG. 6 illustrates a method of adjusting an amount of wireless power transmission by variably controlling a duty cycle.

As shown, a wireless power transmitter transmits AC power to a corresponding target device using reference frequency 1 (F1) in a period 611. Since the wireless power transmitter may not use F1 in a period 613, the wireless power transmitter may not transmit AC power to the target device. The wireless power transmitter may again transmit AC power to the target device using F1 in a period 615. Even though an instantaneous power may increase and decrease, an average power may generally remain constant.

A period 621 is shorter than a period 611, and a period 623 is shorter than a period 613. When a period decreases, the duty cycle may decrease. For instance, when the duty cycle decreases, a peak value of AC power may increase and an average power value may decrease.

Therefore, the wireless power transmitter may variably adjust the duty cycle and thus, may transmit AC power based on a need of the target device.

Figure 7:
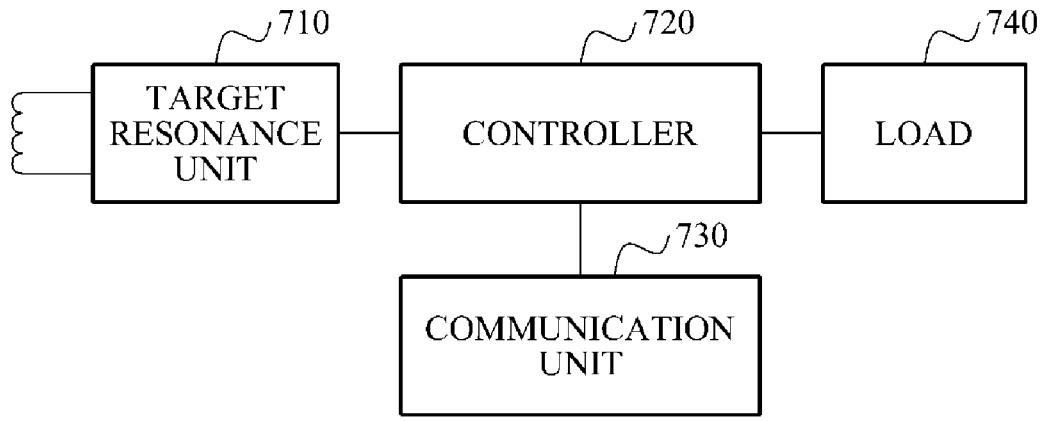
FIG. 7 is a block diagram illustrating a wireless power receiver.

FIG. 7 illustrates a wireless power receiver.

As shown, the wireless power receiver may include a target resonance unit 710, a controller 720, and a communication unit 730. The wireless power receiver provides power to a load 740.

The target resonance unit 710 may receive, from a source resonator, AC power or a wake-up signal through a magnetic coupling. The target resonance unit 710 may be configured to receive, from the source resonator, AC power during a predetermined duty cycle, through the magnetic coupling.

The controller 720 may determine a resonance frequency between the source resonator and an awakened target device. The controller 720 may determine the resonance frequency based on information associated with the distance between the source resonator and a target resonator, the resonance impedance, impedance mismatching, and the location of the target resonator on the source resonator. The information associated with the distance between the source resonator and the target resonator, the resonance impedance, the impedance mismatching, and the location of the target resonator on the source resonator may be received from a wireless power transmitter via the communication unit 730.

The controller 720 may control the resonance frequency between the source resonator and the awakened target device, based on transmission efficiency of AC power. The controller 720 may calculate the transmission efficiency of a received AC power, and may control the resonance frequency to enable the transmission efficiency of the AC power to have a peak value.

The controller 720 may control an impedance of the wireless power receiver so that the target resonator and the load 740 have a matching impedance in the target device. The controller 720 may control the matching impedance between the target resonator and the load 740 so that the received AC power is effectively transferred to the load 740.

The controller 720 may transfer the received AC power to the load. The controller 720 may obtain a DC voltage from the AC power, and may supply the obtained DC voltage to the load 740. The controller 720 may include an AC/DC converter and a DC/DC converter. The AC/DC converter may convert an AC signal to a DC signal, and the DC/DC converter may adjust a signal level of a DC signal to supply a rated voltage to a device or to a load.

The controller 720 may determine whether a target device is awakened by the wake-up signal and whether the target device needs charging. The controller 720 may determine whether the target device needs charging, for example, based on an inner condition, such as a lifespan of a battery, a discharge level of the battery, and the like.

The communication unit 730 may transmit a response signal corresponding to the wake-up signal, a charging request signal, an ID of the awakened target device, and state information associated with the awakened target device. The state information associated with the awakened target device may include power received by the awakened target device, a charging level of the awakened target device, a load suddenly applied to the awakened target device, power requested by a user, and/or the like.

The communication unit 730 may transmit information associated with the response signal corresponding to the wake-up signal, the charging request signal, an ID of an awakened target resonator, and the ID of the awakened target device.

Figure 8:
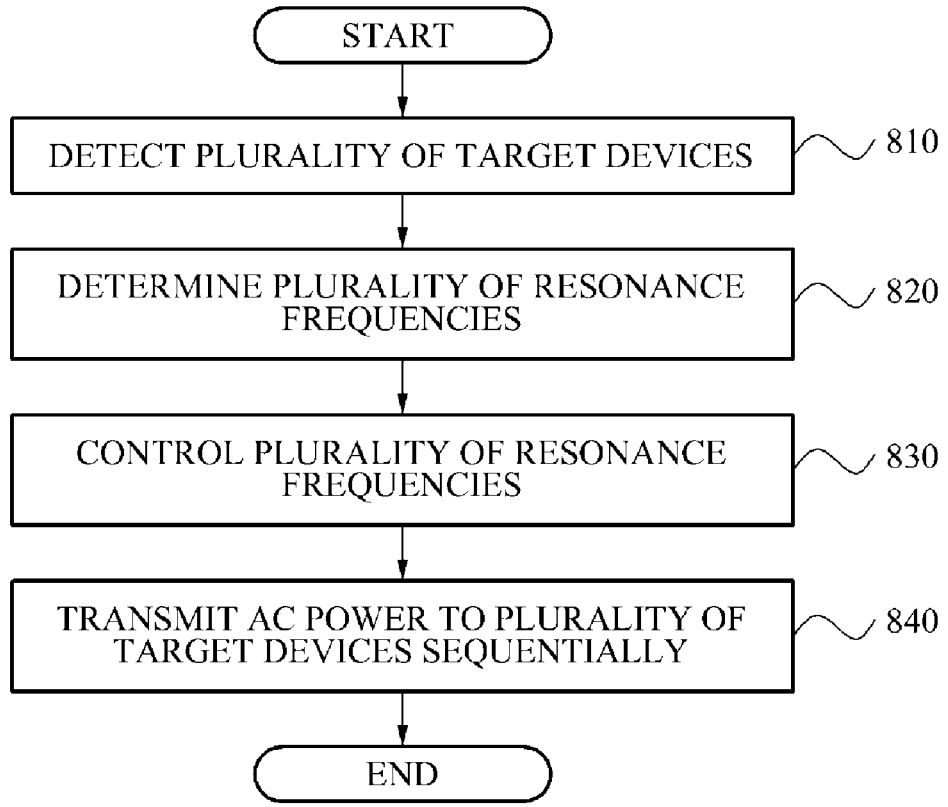
FIG. 8 is a flowchart illustrating a wireless power transmission method.

FIG. 8 illustrates a wireless power transmission method.

In operation 810, a wireless power transmitter detects a plurality of target devices, based on a response signal corresponding to a wake-up signal that is used to awaken the plurality of target devices using AC power.

In operation 820, the wireless power transmitter determines a plurality of resonance frequencies between the source resonator and the plurality of detected target devices.

The wireless power transmitter may determine the plurality of resonance frequencies based on distances between the source resonator and a plurality of target resonators, resonance impedances, impedance mismatching, and locations of the plurality of target resonators on the source resonator.

The wireless power transmitter may be configured to set an initial resonance frequency in a predetermined range for each of the plurality of detected target devices, may transmit AC power, may receive information associated with wireless power transmission efficiency from a target device that receives the AC power, and may variably determine an optimal resonance frequency.

In operation 830, the wireless power transmitter may control the plurality of resonance frequencies so that AC power may sequentially transmitted to the plurality of the detected target devices.

For example, the wireless power transmitter may control the plurality of resonance frequencies that matches the plurality of detected target devices, respectively, to be used sequentially.

The wireless power transmitter may variably control a duty cycle corresponding to a transmission period of AC power, for instance, based on state information associated with the plurality of detected target devices.

In operation 840, the wireless power transmitter sequentially transmits AC power to the plurality of detected target devices, through a magnetic coupling between the source resonator and the plurality of target resonators.

The wireless power transmitter may receive, from the plurality of detected target devices, the response signal corresponding to the wake-up signal, IDs of target resonators included in the plurality of detected target devices, IDs of the plurality of detected target devices, and state information associated with the plurality of detected target devices.

Figure 9:
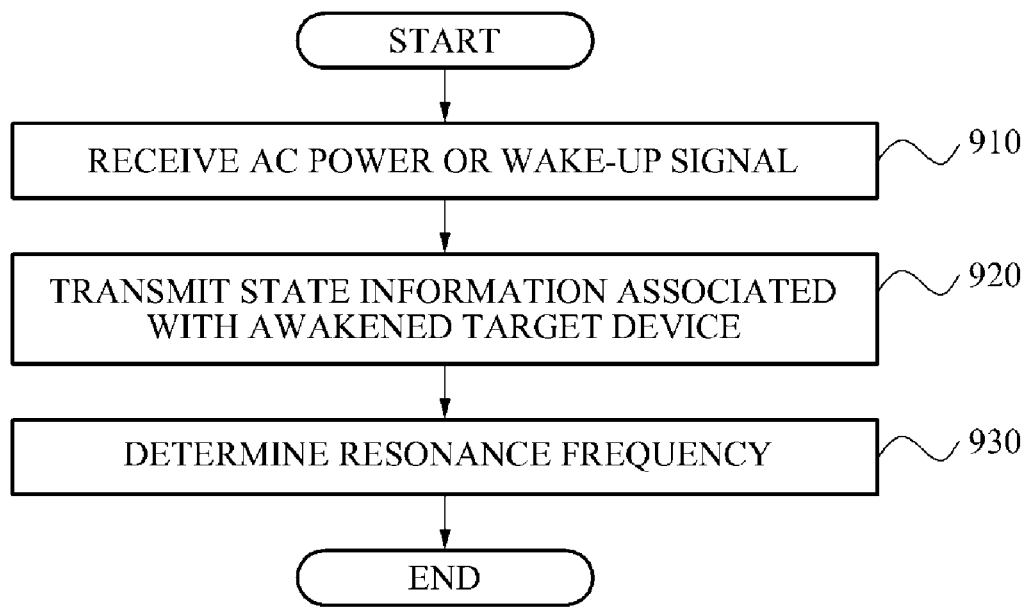
FIG. 9 is a flowchart illustrating a wireless power reception method.

FIG. 9 illustrates a wireless power reception method.

In operation 910, a wireless power receiver receives AC power or a wake-up signal from a source resonator, through a magnetic coupling.

The wireless power receiver receives AC power from the source resonator through a magnetic coupling during a duty cycle.

In operation 920, the wireless power receiver transmits a response signal corresponding to the wake-up signal, a charging request signal, an ID of an awakened target device, and state information associated with the awakened target device.

In operation 930, the wireless power receiver determines a resonance frequency between the source resonator and the awakened target device. The wireless power receiver may determine the resonance frequency, based on a distance between the source resonator and a target resonator, resonance impedance, impedance mismatching, and/or a location of the target resonator on the source resonator.

The wireless power receiver may determine the resonance frequency between the source resonator and the awakened target device, based on transmission efficiency of the AC power.

Figure 10:
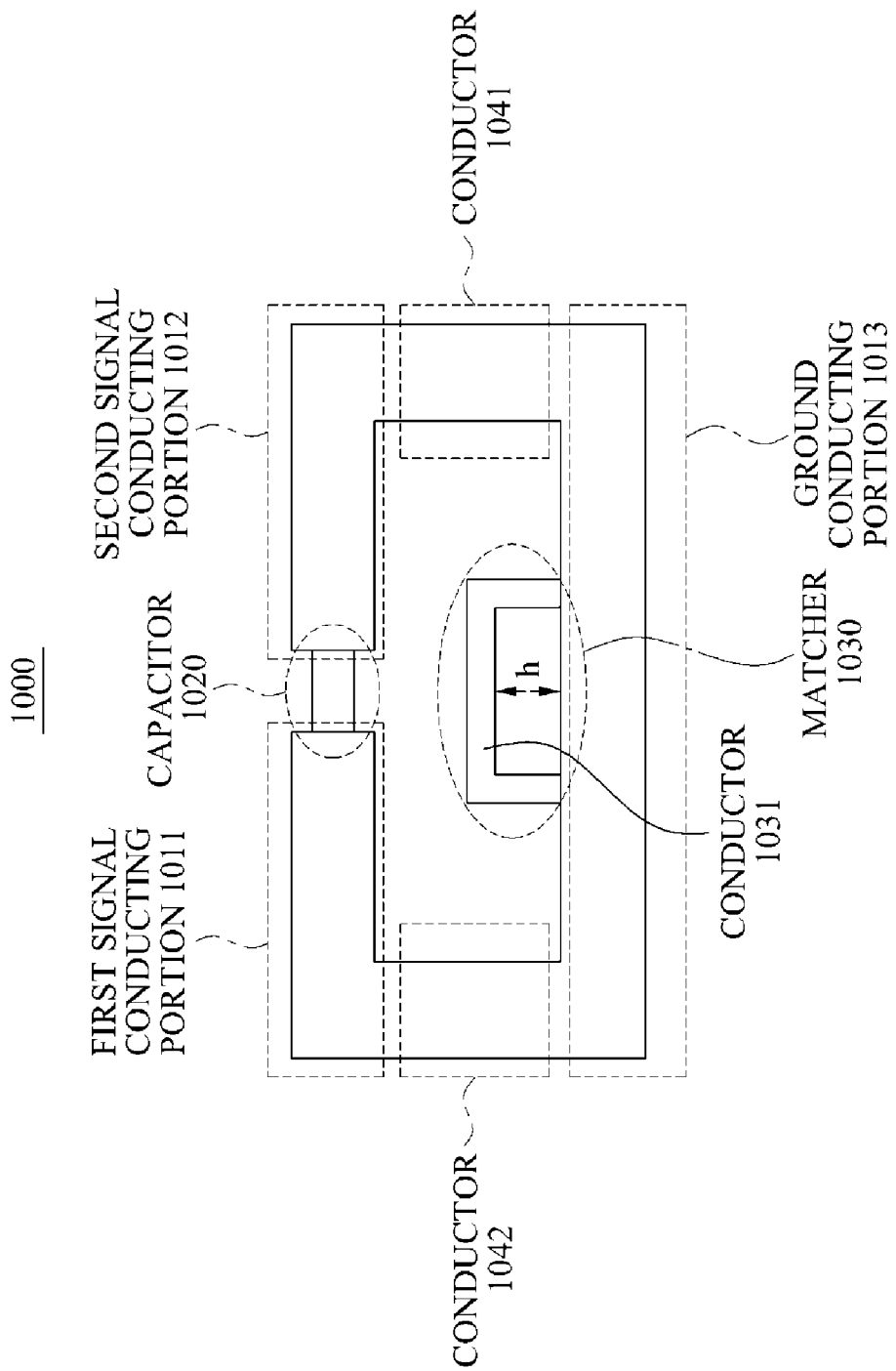
FIG. 10 is a diagram illustrating a resonator having a two-dimensional (2D) structure.

FIG. 10 illustrates a resonator 1000 having a two-dimensional (2D) structure.

As shown, the resonator 1000 having the 2D structure may include a transmission line, a capacitor 1020, a matcher 1030, and conductors 1041 and 1042. The transmission line may include, for instance, a first signal conducting portion 1011, a second signal conducting portion 1012, and a ground conducting portion 1013.

The capacitor 1020 may be inserted or otherwise positioned in series between the first signal conducting portion 1011 and the second signal conducting portion 1012 so that an electric field may be confined within the capacitor 1020. In various implementations, the transmission line may include at least one conductor in an upper portion of the transmission line, and may also include at least one conductor in a lower portion of the transmission line. Current may flow through the at least one conductor disposed in the upper portion of the transmission line and the at least one conductor disposed in the lower portion of the transmission may be electrically grounded.

As shown in FIG. 10, the resonator 1000 may be configured to have a generally 2D structure. The transmission line may include the first signal conducting portion 1011 and the second signal conducting portion 1012 in the upper portion of the transmission line, and may include the ground conducting portion 1013 in the lower portion of the transmission line. As shown, the first signal conducting portion 1011 and the second signal conducting portion 1012 may be disposed to face the ground conducting portion 1013 with current flowing through the first signal conducting portion 1011 and the second signal conducting portion 1012.

In some implementations, one end of the first signal conducting portion 1011 may be electrically connected (i.e., shorted) to a conductor 1042, and another end of the first signal conducting portion 1011 may be connected to the capacitor 1020. And one end of the second signal conducting portion 1012 may be grounded to the conductor 1041, and another end of the second signal conducting portion 1012 may be connected to the capacitor 1020. Accordingly, the first signal conducting portion 1011, the second signal conducting portion 1012, the ground conducting portion 1013, and the conductors 1041 and 1042 may be connected to each other such that the resonator 1000 may have an electrically "closed-loop structure." The term "closed-loop structure" as used herein, may include a polygonal structure, for example, a circular structure, a rectangular structure, or the like that is electrically closed. The capacitor 1020 may be inserted into an intermediate portion of the transmission line. For example, the capacitor 1020 may be inserted into a space between the first signal conducting portion 1011 and the second signal conducting portion 1012. The capacitor 1020 may be configured, in some instances, a lumped element, a distributed element, and the like. In one implementation, a distributed capacitor may be configured as a distributed element and may include zigzagged conductor lines and a dielectric material having a relatively high permittivity between the zigzagged conductor lines.

One or more of the materials of the resonator embodiments disclosed herein may be metamaterials.

An electromagnetic characteristic of many materials found in nature is that they have a unique magnetic permeability or a unique permittivity. Most materials typically have a positive magnetic permeability or a positive permittivity. Thus, for these materials, a right hand rule may be applied to an electric field, a magnetic field, and a pointing vector and thus, the corresponding materials may be referred to as right handed materials (RHMs).

On the other hand, a material having a magnetic permeability or a permittivity which is not ordinarily found in nature or is artificially-designed (or man-made) may be referred to herein as a "metamaterial." Metamaterials may be classified into an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

The magnetic permeability may indicate a ratio between a magnetic flux density occurring with respect to a given magnetic field in a corresponding material and a magnetic flux density occurring with respect to the given magnetic field in a vacuum state. The magnetic permeability and the permittivity, in some embodiments, may be used to determine a propagation constant of a corresponding material in a given frequency or a given wavelength. An electromagnetic characteristic of the corresponding material may be determined based on the magnetic permeability and the permittivity. According to an aspect, the metamaterial may be easily disposed in a resonance state without significant material size changes. This may be practical for a relatively large wavelength area or a relatively low frequency area, for instance.

When the capacitor 1020 is inserted into the transmission line, the resonator 1000 may have a property of a metamaterial, as discussed above For example, the resonator 1000 may have a negative magnetic permeability due to the capacitance of the capacitor 1020. If so, the resonator 1000 may also be referred to as a mu negative (MNG) resonator. Various criteria may be applied to determine the capacitance of the capacitor 1020. For example, the various criteria for enabling the resonator 1000 to have the characteristic of the metamaterial may include one or more of the following: a criterion for enabling the resonator 1000 to have a negative magnetic permeability in a target frequency, a criterion for enabling the resonator 1000 to have a zeroth order resonance characteristic in the target frequency, or the like. The resonator 1000 may also have a zeroth order resonance characteristic (i.e., having, as a resonance frequency, a frequency when a propagation constant is "0"). If the resonator 1000 has a zeroth order resonance characteristic, the resonance frequency may be independent corresponding to a physical size of the MNG resonator 1000. Moreover, by appropriately designing the capacitor 1020, the MNG resonator 1000 may sufficiently change the resonance frequency without substantially changing the physical size of the MNG resonator 1000.

In a near field, for instance, the electric field may be concentrated on the capacitor 1020 inserted into the transmission line. Accordingly, due to the capacitor 1020, the magnetic field may become dominant in the near field. In one or more embodiments, the MNG resonator 1000 may have a relatively high Q-factor using the capacitor 1020 of the lumped element. Thus, it may be possible to enhance power transmission efficiency. For example, the Q-factor indicates a level of an ohmic loss or a ratio of a reactance corresponding to a resistance in the wireless power transmission. The efficiency of the wireless power transmission may increase according to an increase in the Q-factor.

The MNG resonator 1000 may include a matcher 1030 for impedance-matching. For example, the matcher 1030 may be configured to appropriately adjust the strength of a magnetic field of the MNG resonator 1000, for instance. The impedance of the MNG resonator 1000 may be determined by the matcher 1030. Depending of the configuration, a current may flow in the MNG resonator 1000 via a connector, or may flow out from the MNG resonator 1000 via the connector. The connector may be connected to the ground conducting portion 1013 or the matcher 1030. In some instances, power may be transferred through coupling without using a physical connection between the connector and the ground conducting portion 1013 or the matcher 1030.

As shown in FIG. 10, the matcher 1030 may be positioned within the loop formed by the loop structure of the resonator 1000. The matcher 1030 may adjust the impedance of the resonator 1000 by changing the physical shape of the matcher 1030. For example, the matcher 1030 may include the conductor 1031 for the impedance matching positioned in a location that is separate from the ground conducting portion 1013 by a distance h. Accordingly, the impedance of the resonator 1000 may be changed by adjusting the distance h.

In some instances, a controller may be provided to control the matcher 1030 which generates and transmits a control signal to the matcher 1030 directing the matcher to change its physical shape so that the impedance of the resonator may be adjusted. For example, the distance h between a conductor 1031 of the matcher 1030 and the ground conducting portion 1013 may be increased or decreased based on the control signal. The controller may generate the control signal based on various factors.

As shown in FIG. 10, the matcher 1030 may be configured as a passive element such as the conductor 1031, for example. Of course, in other embodiments, the matcher 1030 may be configured as an active element such as a diode, a transistor, or the like. If the active element is included in the matcher 1030, the active element may be driven based on the control signal generated by the controller, and the impedance of the resonator 1000 may be adjusted based on the control signal. For example, when the active element is a diode included in the matcher 1030, the impedance of the resonator 1000 may be adjusted depending on whether the diode is in an ON state or in an OFF state.

In some instances, a magnetic core may be further provided to pass through the MNG resonator 1000. The magnetic core may perform a function of increasing a power transmission distance.

Figure 11:
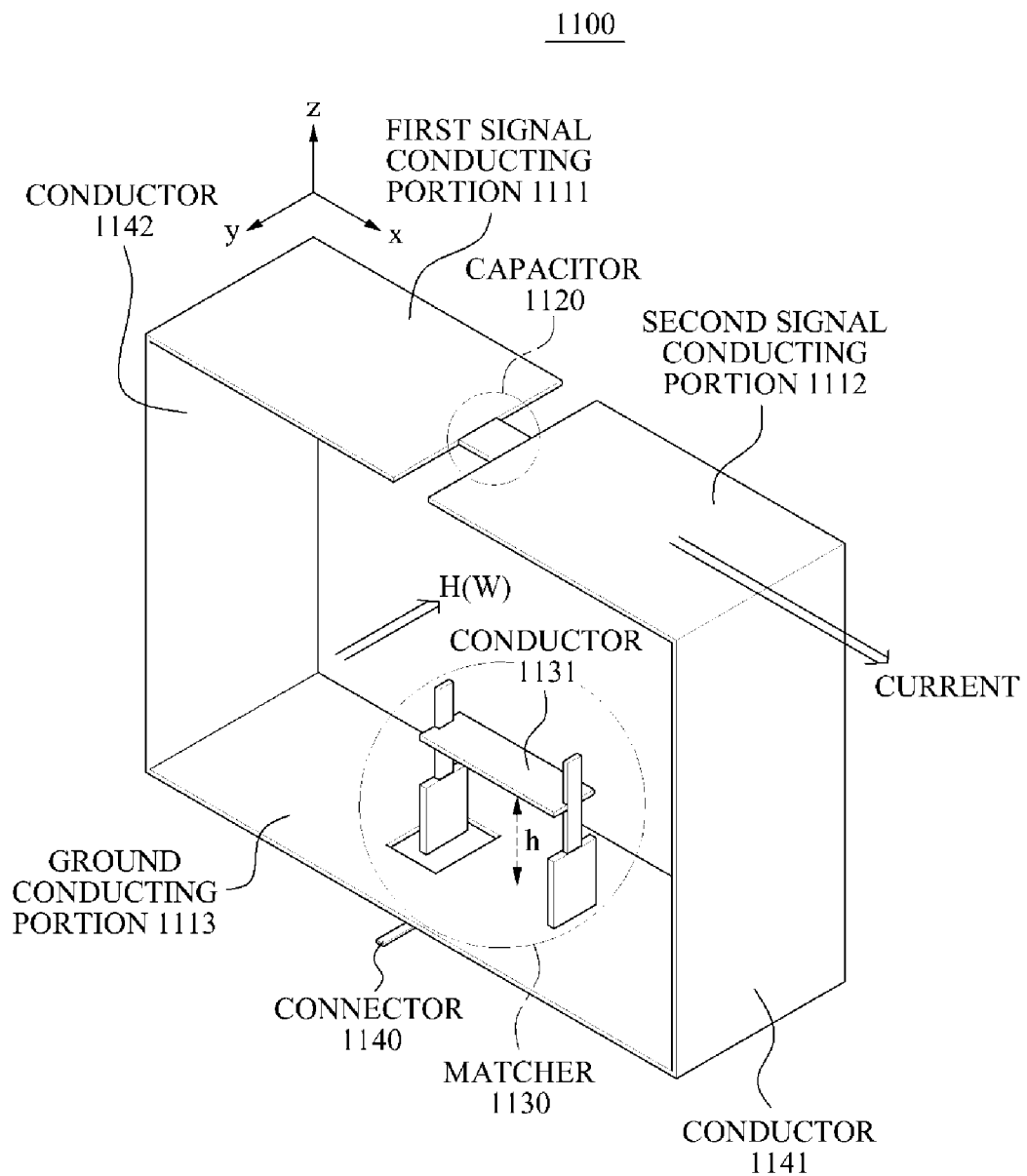
FIG. 11 is a diagram illustrating a resonator having a three-dimensional (3D) structure.

FIG. 11 illustrates a resonator 1100 having a three-dimensional (3D) structure. Referring to FIG. 11, the resonator 1100 having the 3D structure may include a transmission line and a capacitor 1120. The transmission line may include a first signal conducting portion 1111, a second signal conducting portion 1112, and a ground conducting portion 1113. The capacitor 1120 may be inserted, for instance, in series between the first signal conducting portion 1111 and the second signal conducting portion 1112 of the transmission link such that an electric field may be confined within the capacitor 1120.

As shown in FIG. 11, the resonator 1100 may have a generally 3D structure. The transmission line may include the first signal conducting portion 1111 and the second signal conducting portion 1112 in an upper portion of the resonator 1100, and may include the ground conducting portion 1113 in a lower portion of the resonator 1100. The first signal conducting portion 1111 and the second signal conducting portion 1112 may be disposed to face the ground conducting portion 1113. In this arrangement, current may flow in an x direction through the first signal conducting portion 1111 and the second signal conducting portion 1112. Due to the current, a magnetic field H(W) may be formed in a −y direction. However, it will be appreciated that the magnetic field H(W) might also be formed in the opposite directions (e.g., a +y direction) in other implementations.

In one or more embodiments, one end of the first signal conducting portion 1111 may be electrically connected (i.e., shorted) to a conductor 1142, and another end of the first signal conducting portion 1111 may be connected to the capacitor 1120. One end of the second signal conducting portion 1112 may be grounded to the conductor 1141, and another end of the second signal conducting portion 1112 may be connected to the capacitor 1120. Accordingly, the first signal conducting portion 1111, the second signal conducting portion 1112, the ground conducting portion 1113, and the conductors 1141 and 1142 may be connected to each other, whereby the resonator 1100 may have an electrically closed-loop structure. As shown in FIG. 11, the capacitor 1120 may be inserted or otherwise positioned between the first signal conducting portion 1111 and the second signal conducting portion 1112. For example, the capacitor 1120 may be inserted into a space between the first signal conducting portion 1111 and the second signal conducting portion 1112. The capacitor 1120 may include, for example, a lumped element, a distributed element, and the like. In one implementation, a distributed capacitor having the shape of the distributed element may include zigzagged conductor lines and a dielectric material having a relatively high permittivity positioned between the zigzagged conductor lines.

When the capacitor 1120 is inserted into the transmission line, the resonator 1100 may have a property of a metamaterial, in some instances, as discussed above.

For example, when a capacitor is used as a lumped element, the resonator 1100 may have the characteristic of the metamaterial. When the resonator 1100 has a negative magnetic permeability by appropriately adjusting the capacitance of the capacitor 1120, the resonator 1100 may also be referred to as an MNG resonator. Various criteria may be applied to determine the capacitance of the capacitor 1120. For example, the various criteria may include, for instance, one or more of the following: a criterion for enabling the resonator 1100 to have the characteristic of the metamaterial, a criterion for enabling the resonator 1100 to have a negative magnetic permeability in a target frequency, a criterion enabling the resonator 1100 to have a zeroth order resonance characteristic in the target frequency, or the like. Based on at least one criterion among the aforementioned criteria, the capacitance of the capacitor 1120 may be determined.

The resonator 1100 may have a zeroth order resonance characteristic (i.e., having, as a resonance frequency, a frequency when a propagation constant is "0"). If the resonator 1100 has a zeroth order resonance characteristic, the resonance frequency may be independent with respect to a physical size of the MNG resonator 1100. Thus, by appropriately designing (or configuring) the capacitor 1120, the MNG resonator 1100 may sufficiently change the resonance frequency without substantially changing the physical size of the MNG resonator 1100.

Referring to the MNG resonator 1100 of FIG. 11, in a near field, the electric field may be concentrated on the capacitor 1120 inserted into the transmission line. Accordingly, due to the capacitor 1120, the magnetic field may become dominant in the near field. And, since the MNG resonator 1100 having the zeroth-order resonance characteristic may have characteristics similar to a magnetic dipole, the magnetic field may become dominant in the near field. A relatively small amount of the electric field formed due to the insertion of the capacitor 1120 may be concentrated on the capacitor 1120 and thus, the magnetic field may become further dominant.

Also, the MNG resonator 1100 may include a matcher 1130 for impedance-matching. The matcher 1130 may be configured to appropriately adjust the strength of magnetic field of the MNG resonator 1100. The impedance of the MNG resonator 1100 may be determined by the matcher 1130. Current may flow in the MNG resonator 1100 via a connector 1140, or may flow out from the MNG resonator 1100 via the connector 1140. And the connector 1140 may be connected to the ground conducting portion 1113 or the matcher 1130.

As shown in FIG. 11, the matcher 1130 may be positioned within the loop formed by the loop structure of the resonator 1100. The matcher 1130 may be configured to adjust the impedance of the resonator 1100 by changing the physical shape of the matcher 1130. For example, the matcher 1130 may include the conductor 1131 for the impedance-matching in a location separate from the ground conducting portion 1113 by a distance h. The impedance of the resonator 1100 may be changed by adjusting the distance h.

In some implementations, a controller may be provided to control the matcher 1130. In this case, the matcher 1130 may change the physical shape of the matcher 1130 based on a control signal generated by the controller. For example, the distance h between the conductor 1131 of the matcher 1130 and the ground conducting portion 1113 may be increased or decreased based on the control signal. Accordingly, the physical shape of the matcher 1130 may be changed such that the impedance of the resonator 1100 may be adjusted. The distance h between the conductor 1131 of the matcher 1130 and the ground conducting portion 1113 may be adjusted using a variety of schemes. As one example, a plurality of conductors may be included in the matcher 1130 and the distance h may be adjusted by adaptively activating one of the conductors. For example, the distance h may be adjusted by adjusting the physical location of the conductor 1131 up and down. The distance h may be controlled based on the control signal of the controller. The controller may generate the control signal using various factors.

As shown in FIG. 11, the matcher 1130 may be configured as a passive element such as the conductor 1131, for instance. Of course, in other embodiments, the matcher 1130 may be configured as an active element such as a diode, a transistor, or the like. When the active element is included in the matcher 1130, the active element may be driven based on the control signal generated by the controller, and the impedance of the resonator 1100 may be adjusted based on the control signal. For example, if the active element is a diode included in the matcher 1130, the impedance of the resonator 1100 may be adjusted depending on whether the diode is in an ON state or in an OFF state.

In some implementations, a magnetic core may be further provided to pass through the resonator 1100 configured as the MNG resonator. The magnetic core may perform a function of increasing a power transmission distance.

Figure 12:
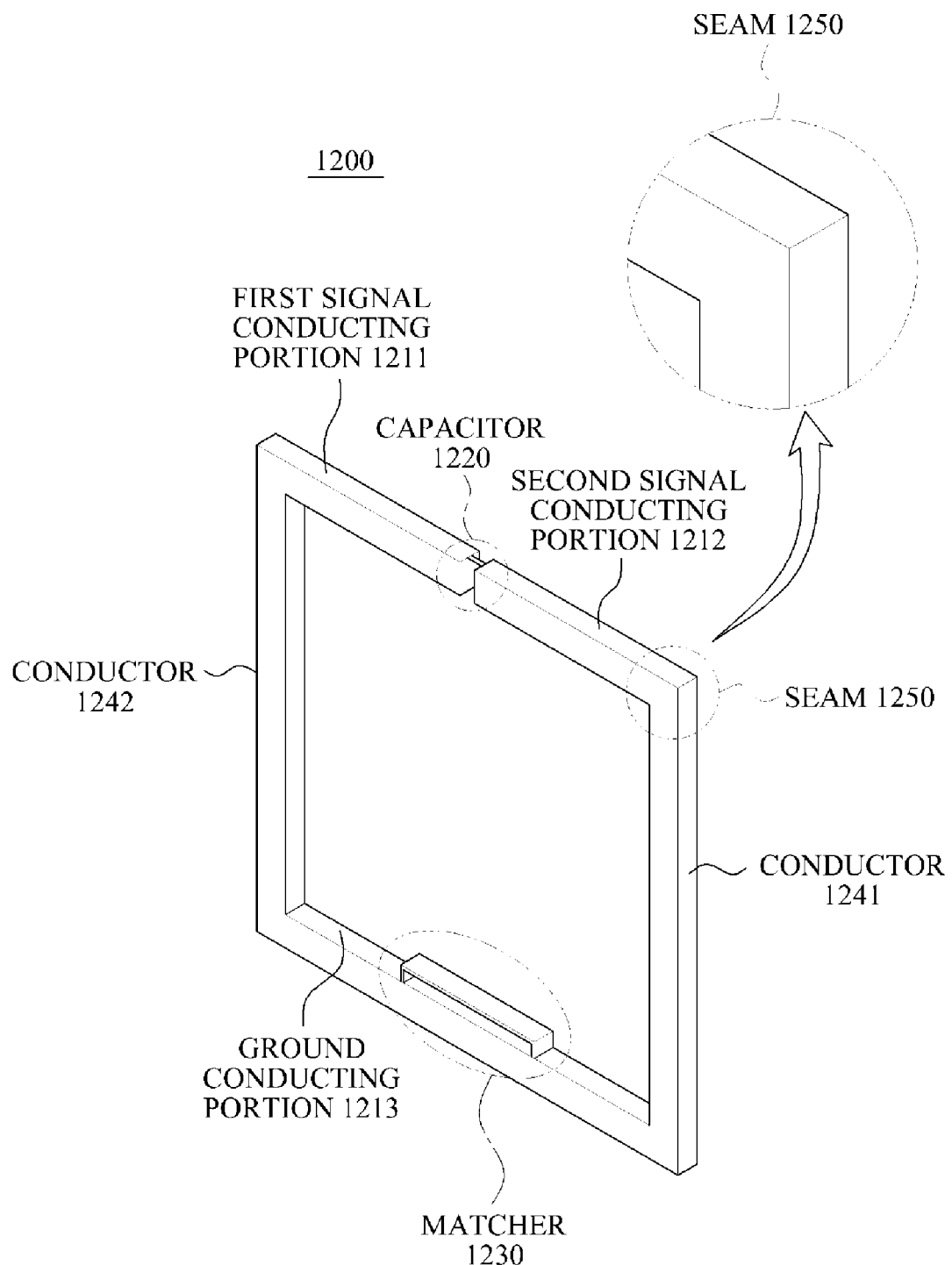
FIG. 12 is a diagram illustrating a resonator for wireless power transmission configured as a bulky type.

FIG. 12 illustrates a resonator 1200 for a wireless power transmission configured as a bulky type. As used herein, the term "bulky type" may refer to a seamless connection connecting at least two parts in an integrated form.

Referring to FIG. 12, a first signal conducting portion 1211 and a conductor 1242 may be integrally formed instead of being separately manufactured and thereby be connected to each other. Similarly, the second signal conducting portion 1212 and a conductor 1241 may also be integrally manufactured.

When the second signal conducting portion 1212 and the conductor 1241 are separately manufactured and then are connected to each other, a loss of conduction may occur due to a seam 1250. Thus, in some implementations, the second signal conducting portion 1212 and the conductor 1241 may be connected to each other without using a separate seam (i.e., seamlessly connected to each other). Accordingly, it may be possible to decrease a conductor loss caused by the seam 1250. For instance, the second signal conducting portion 1212 and a ground conducting portion 1213 may be seamlessly and integrally manufactured. Similarly, the first signal conducting portion 1211, the conductor 1242 and the ground conducting portion 1213 may be seamlessly and integrally manufactured.

Figure 13:
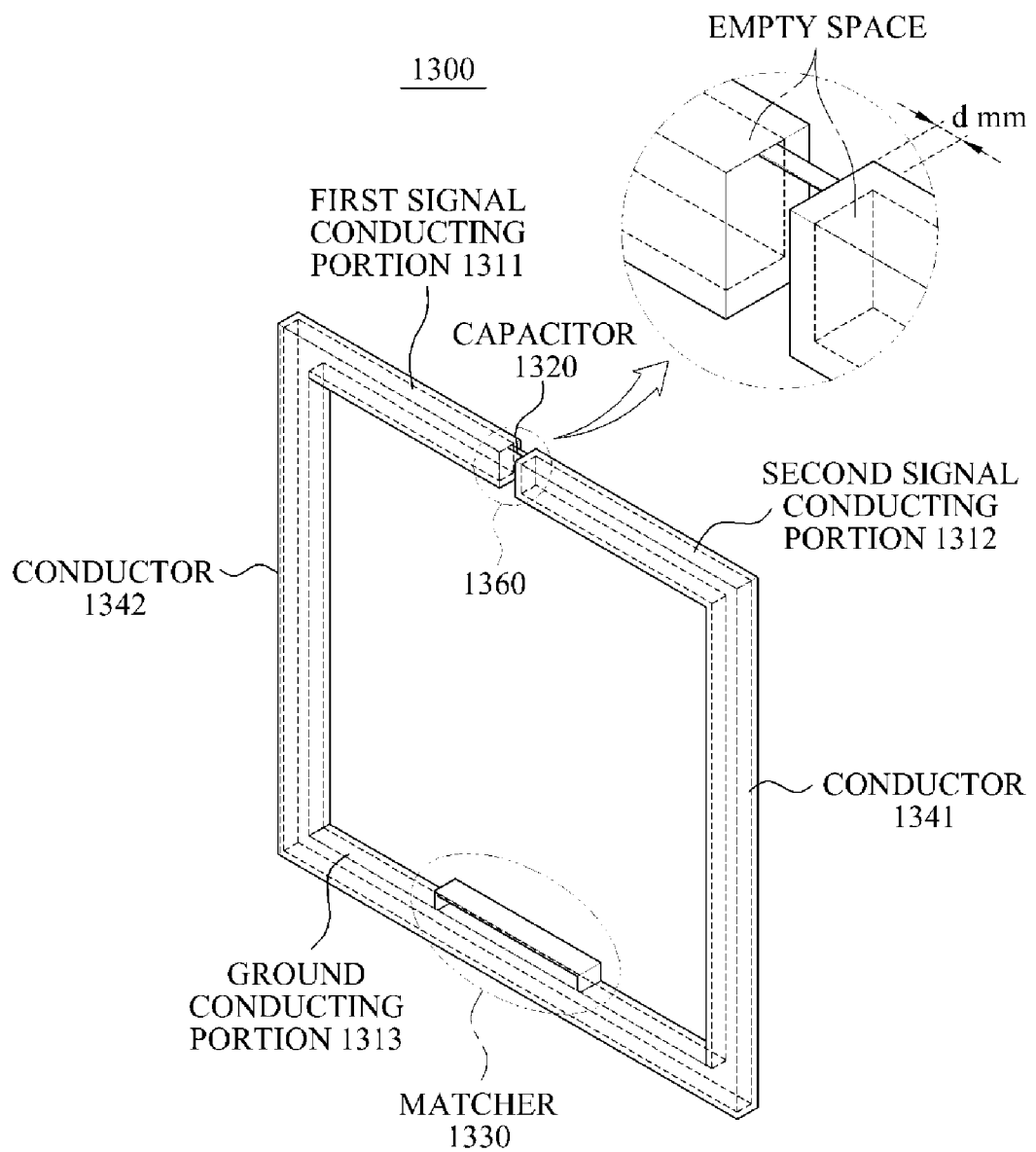
FIG. 13 is a diagram illustrating a resonator for wireless power transmission configured as a hollow type.

A matcher 1230 may be provided that is similarly constructed as described herein in one or more embodiments. FIG. 13 illustrates a resonator 1300 for a wireless power transmission, configured as a hollow type. As used herein the term "hollow type" refers to a configuration that may include an empty space inside.

Referring to FIG. 13, each of a first signal conducting portion 1311, a second signal conducting portion 1312, a ground conducting portion 1313, and conductors 1341 and 1342 of the resonator 1300 configured as the hollow type structure.

For a given resonance frequency, an active current may be modeled to flow in only a portion of the first signal conducting portion 1311 instead of all of the first signal conducting portion 1311, a portion of the second signal conducting portion 1312 instead of all of the second signal conducting portion 1312, a portions of the ground conducting portion 1313 instead of all of the ground conducting portion 1313, and/or a portions of the conductors 1341 and 1342 instead of all of the conductors 1341 and 1342. When a depth of each of the first signal conducting portion 1311, the second signal conducting portion 1312, the ground conducting portion 1313, and the conductors 1341 and 1342 is significantly deeper than a corresponding skin depth in the given resonance frequency, it may be ineffective. The significantly deeper depth may, however, increase a weight or manufacturing costs of the resonator 1300 in some instances.

Accordingly, for the given resonance frequency, the depth of the first signal conducting portion 1311, the second signal conducting portion 1312, the ground conducting portion 1313, and the conductors 1341 and 1342 may be appropriately determined based on the corresponding skin depth of each of the first signal conducting portion 1311, the second signal conducting portion 1312, the ground conducting portion 1313, and the conductors 1341 and 1342. When the first signal conducting portion 1311, the second signal conducting portion 1312, the ground conducting portion 1313, and the conductors 1341 and 1342 has an appropriate depth deeper than a corresponding skin depth, the resonator 1300 may weigh less, and manufacturing costs of the resonator 1300 may also be decreased.

For example, as shown in FIG. 13, the depth of the second signal conducting portion 1312 (as further illustrated in the enlarged view region 1360 indicated by a circle) may be determined as mm and "d" may be determined according to $$d = \frac{1}{\sqrt{\pi f \mu \sigma}}.$$

Here, f denotes a frequency, µ denotes a magnetic permeability, and σ denotes a conductor constant. In one implementations, when the first signal conducting portion 1311, the second signal conducting portion 1312, the ground conducting portion 1313, and the conductors 1341 and 1342 are made of a copper and they may have a conductivity of $5.8 \times 10^7$ siemens per meter (S·m$^{-1}$), the skin depth may be about 0.6 mm with respect to 10 kHz of the resonance frequency and the skin depth may be about 0.006 mm with respect to 100 MHz of the resonance frequency.

A capacitor 1320 and a matcher 1330 may be provided that are similarly constructed as described herein in one or more embodiments.

Figure 14:
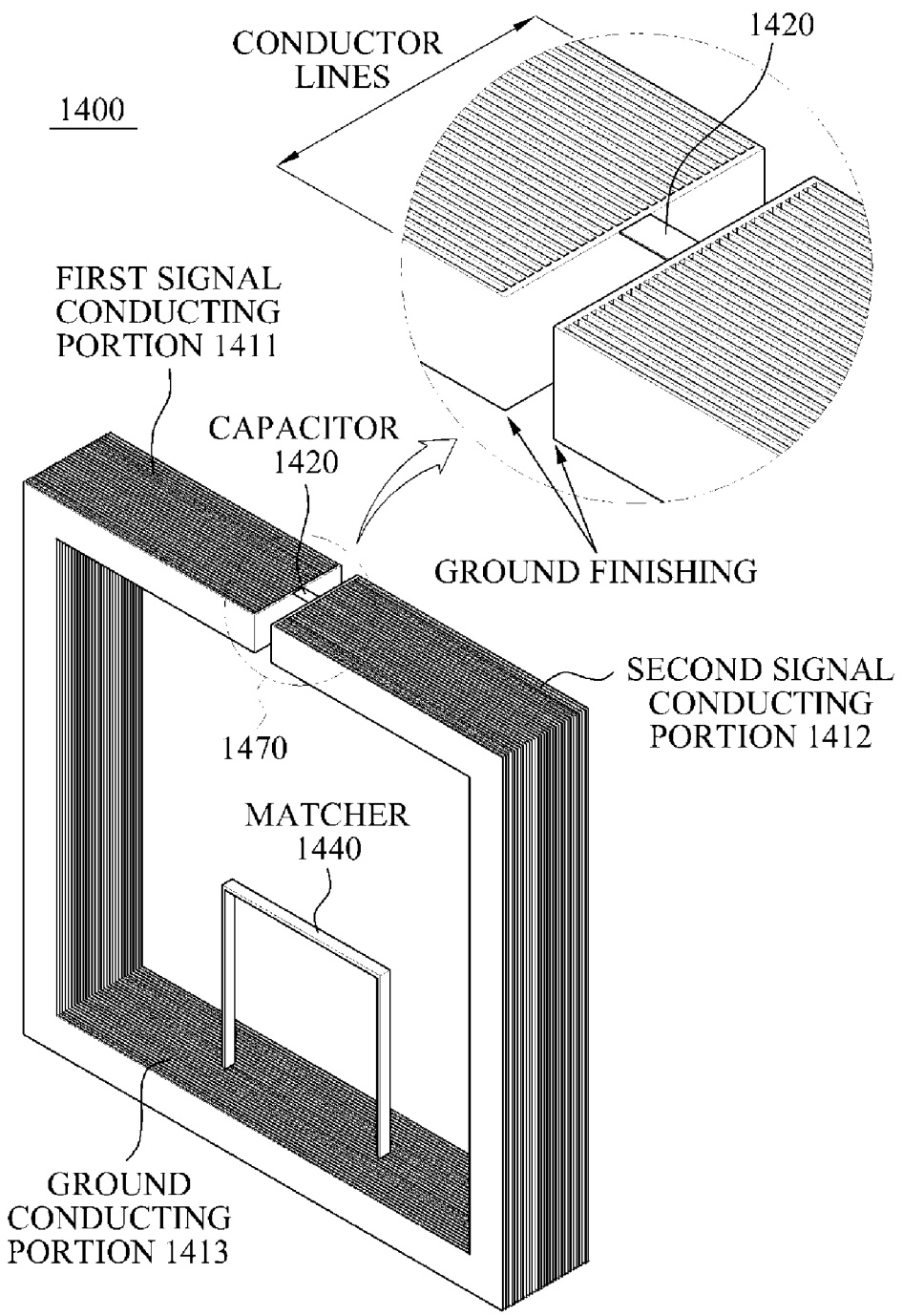
FIG. 14 is a diagram illustrating a resonator for wireless power transmission configured as a parallel-sheet.

FIG. 14 illustrates a resonator 1400 for a wireless power transmission using a parallel-sheet.

Referring to FIG. 14, the parallel-sheet may be applicable to each of a first signal conducting portion 1411 and a second signal conducting portion 1412 included in the resonator 1400.

Each of the first signal conducting portion 1411 and the second signal conducting portion 1412 may not be a perfect conductor and thus, may have an inherent resistance. Due to this resistance, an ohmic loss may occur. The ohmic loss may decrease a Q-factor and also decrease a coupling effect.

By applying the parallel-sheet to each of the first signal conducting portion 1411 and the second signal conducting portion 1412, it may be possible to decrease the ohmic loss, and to increase the Q-factor and the coupling effect. Referring to the enlarged portion 1470 indicated by a circle, when the parallel-sheet is applied, each of the first signal conducting portion 1411 and the second signal conducting portion 1412 may include a plurality of conductor lines. The plurality of conductor lines may be disposed in parallel, and may be electrically connected (i.e., shorted) at an end portion of each of the first signal conducting portion 1411 and the second signal conducting portion 1412.

When the parallel-sheet is applied to each of the first signal conducting portion 1411 and the second signal conducting portion 1412, the plurality of conductor lines may be disposed in parallel. Accordingly, a sum of resistances having the conductor lines may decrease. Consequently, the resistance loss may decrease, and the Q-factor and the coupling effect may be increased.

A capacitor 1420 and a matcher 1430 positioned on the ground conducting portion 1413 may be provided that are similarly constructed as described herein in one or more embodiments.

Figure 15:
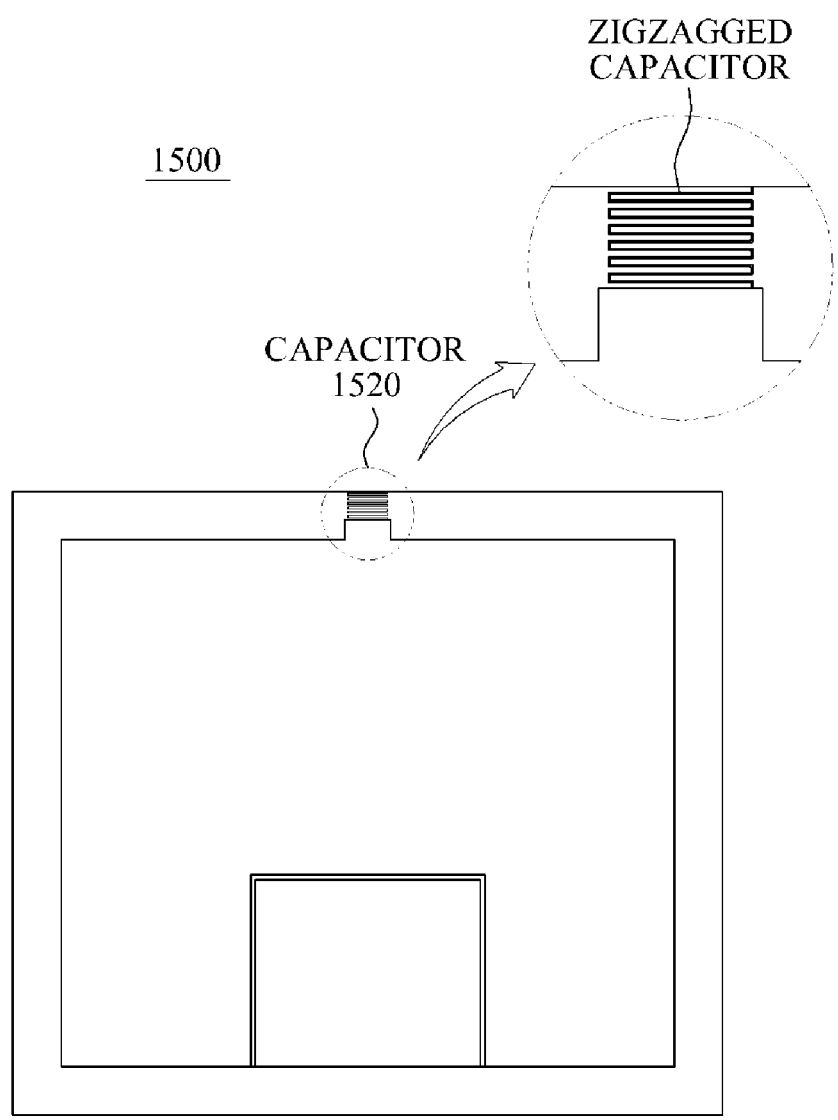
FIG. 15 is a diagram illustrating a resonator for a wireless power transmission, the resonator including a distributed capacitor.

FIG. 15 illustrates a resonator 1500 for a wireless power transmission, including a distributed capacitor.

Referring to FIG. 15, a capacitor 1520 included in the resonator 1500 is configured for the wireless power transmission. A capacitor used as a lumped element may have a relatively high equivalent series resistance (ESR). A variety of schemes have been proposed to decrease the ESR contained in the capacitor of the lumped element. According to an embodiment, by using the capacitor 1520 as a distributed element, it may be possible to decrease the ESR. As will be appreciated, a loss caused by the ESR may decrease a Q-factor and a coupling effect.

As shown in FIG. 15, the capacitor 1520 may be configured as a conductive line having the zigzagged structure.

By employing the capacitor 1520 as the distributed element, it may be possible to decrease the loss occurring due to the ESR in some instances. In addition, by disposing a plurality of capacitors as lumped elements, it is possible to decrease the loss occurring due to the ESR. Since a resistance of each of the capacitors as the lumped elements decreases through a parallel connection, active resistances of parallel-connected capacitors as the lumped elements may also decrease whereby the loss occurring due to the ESR may decrease. For example, by employing ten capacitors of 1 pF each instead of using a single capacitor of 10 pF, it may be possible to decrease the loss occurring due to the ESR in some instances.

Figure 16A:
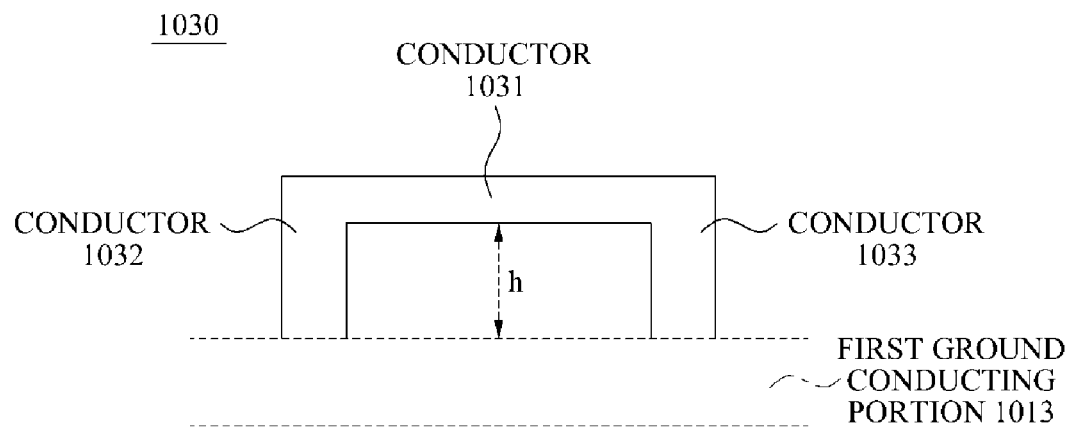
FIG. 16A is a diagram illustrating a matcher used by a 2D resonator.
Figure 16B:
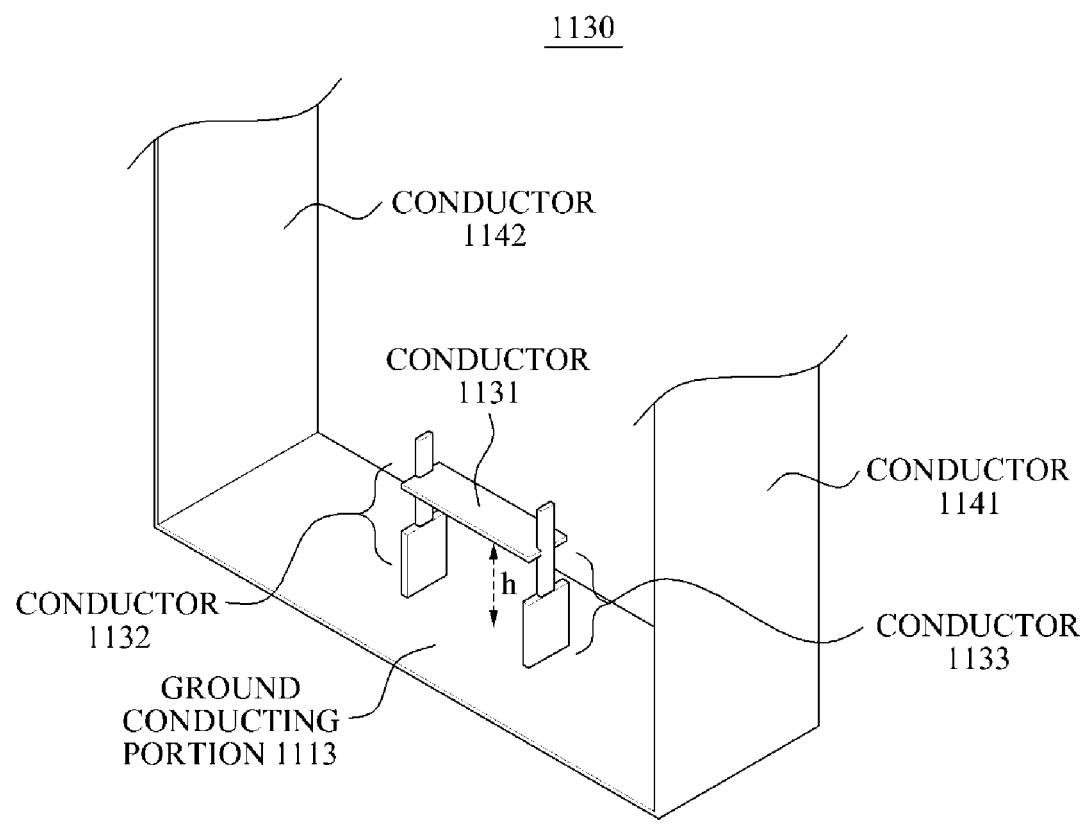
FIG. 16B is a diagram illustrating a matcher used by a 3D resonator.

FIG. 16A illustrates one embodiment of the matcher 1030 used in the resonator 1000 provided in the 2D structure of FIG. 10, and FIG. 16B illustrates an example of the matcher 1130 used in the resonator 1100 provided in the 3D structure of FIG. 11.

FIG. 16A illustrates a portion of the 2D resonator including the matcher 1030, and FIG. 16B illustrates a portion of the 3D resonator of FIG. 11 including the matcher 1130.

Referring to FIG. 16A, the matcher 1030 may include the conductor 1031, a conductor 1032, and a conductor 1033. The conductors 1032 and 1033 may be connected to the ground conducting portion 1013 and the conductor 1031. The impedance of the 2D resonator may be determined based on a distance h between the conductor 1031 and the ground conducting portion 1013. The distance h between the conductor 1031 and the ground conducting portion 1013 may be controlled by the controller. The distance h between the conductor 1031 and the ground conducting portion 1013 may be adjusted using a variety of schemes. For example, the variety of schemes may include one or more of the following: a scheme of adjusting the distance h by adaptively activating one of the conductors 1031, 1032, and 1033, a scheme of adjusting the physical location of the conductor 1031 up and down, or the like.

Referring to FIG. 16B, the matcher 1130 may include the conductor 1131, a conductor 1132, a conductor 1133 and conductors 1141 and 1142. The conductors 1132 and 1133 may be connected to the ground conducting portion 1113 and the conductor 1131. Also, the conductors 1141 and 1442 may be connected to the ground conducting portion 1113. The impedance of the 3D resonator may be determined based on a distance h between the conductor 1131 and the ground conducting portion 1113. The distance h between the conductor 1131 and the ground conducting portion 1113 may be controlled by the controller, for example. Similar to the matcher 1030 included in the 2D structured resonator, in the matcher 1130 included in the 3D structured resonator, the distance h between the conductor 1131 and the ground conducting portion 1113 may be adjusted using a variety of schemes. For example, the variety of schemes may include one or more of the following: a scheme of adjusting the distance h by adaptively activating one of the conductors 1131, 1132, and 1133, a scheme of adjusting the physical location of the conductor 1131 up and down, or the like.

In some implementations, the matcher may include an active element. Thus, a scheme of adjusting an impedance of a resonator using the active element may be similar as described above. For example, the impedance of the resonator may be adjusted by changing a path of a current flowing through the matcher using the active element.

Figure 17:
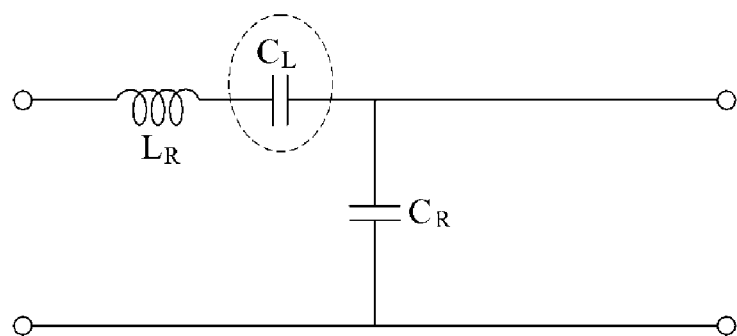
FIG. 17 is a diagram illustrating one equivalent circuit of the resonator for wireless power transmission of FIG. 10.

FIG. 17 illustrates one equivalent circuit of the resonator 1000 for the wireless power transmission of FIG. 10.

The resonator 1000 of FIG. 10 for the wireless power transmission may be modeled to the equivalent circuit of FIG. 17. In the equivalent circuit depicted in FIG. 17, $L_R$ denotes an inductance of the power transmission line, $C_L$ denotes the capacitor 1020 that is inserted in a form of a lumped element in the middle of the power transmission line, and $C_R$ denotes a capacitance between the power transmissions and/or ground of FIG. 10.

In some instances, the resonator 1000 may have a zeroth resonance characteristic. For example, when a propagation constant is "0", the resonator 1000 may be assumed to have $\omega_{MZR}$ as a resonance frequency. The resonance frequency $\omega_{MZR}$ may be expressed by Equation 1.

$$\omega_{MZR} = \frac{1}{\sqrt{L_R C_L}} \quad \text{[Equation 1]}$$

In Equation 1, MZR denotes a Mu zero resonator.

Referring to Equation 1, the resonance frequency $\omega_{MZR}$ of the resonator 1000 may be determined by $L_R/C_L$. A physical size of the resonator 1000 and the resonance frequency $\omega_{MZR}$ may be independent with respect to each other. Since the physical sizes are independent with respect to each other, the physical size of the resonator 1000 may be sufficiently reduced.

Figure 18:
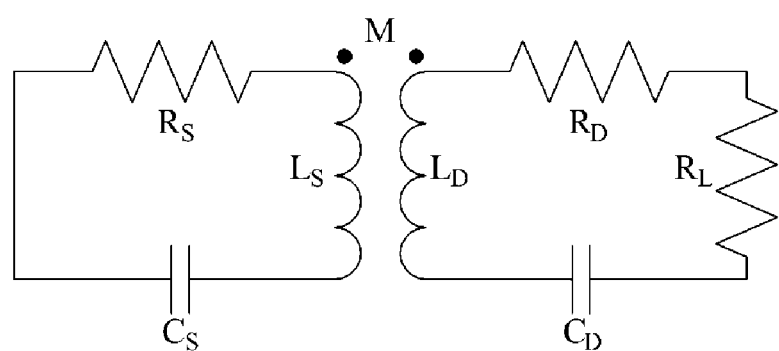
FIG. 18 is one equivalent circuit of a magnetic coupling system.

FIG. 18 illustrates one equivalent circuit of a magnetic coupling system.

Referring to FIG. 18, the subscript of S denotes a source, and subscript of D denotes a receiver device. L denotes a load. The source and the receive device may be configured to transmit and receive wireless power via a magnetic coupling system, respectively.

Each of the source and the receiver device may be configured as a serial RLC resonance circuit The source may transfer energy to the device end using a mutual inductance (M) in a resonance frequency between the source and the device.

The source and the device of FIG. 18 may be expressed, using coupled mode theory, by the following two equations:

$$\frac{da_S}{dt} = (j\omega_S - \Gamma_S)a_S + j\kappa a_D \text{ and}$$

$$\frac{da_D}{dt} = (j\omega_D - \Gamma_D - \Gamma_L)a_D + j\kappa a_S$$

Here, $\omega_S$ may denote a resonance frequency of the source, and $\omega_D$ may denote a resonance frequency of the device. $\Gamma_S$ may denote a decay rate due to a resistance of the source, and $\Gamma=R/2L$. $\Gamma_D$ may denote a decay rate due to a resistance of the device end, $\Gamma_L$ may denote a decay rate due to a resistance of a load. $\kappa$ may denote a coupling coefficient between a source and a device, and $\kappa=\omega M/\sqrt{L_S L_D}$.

Figure 19:
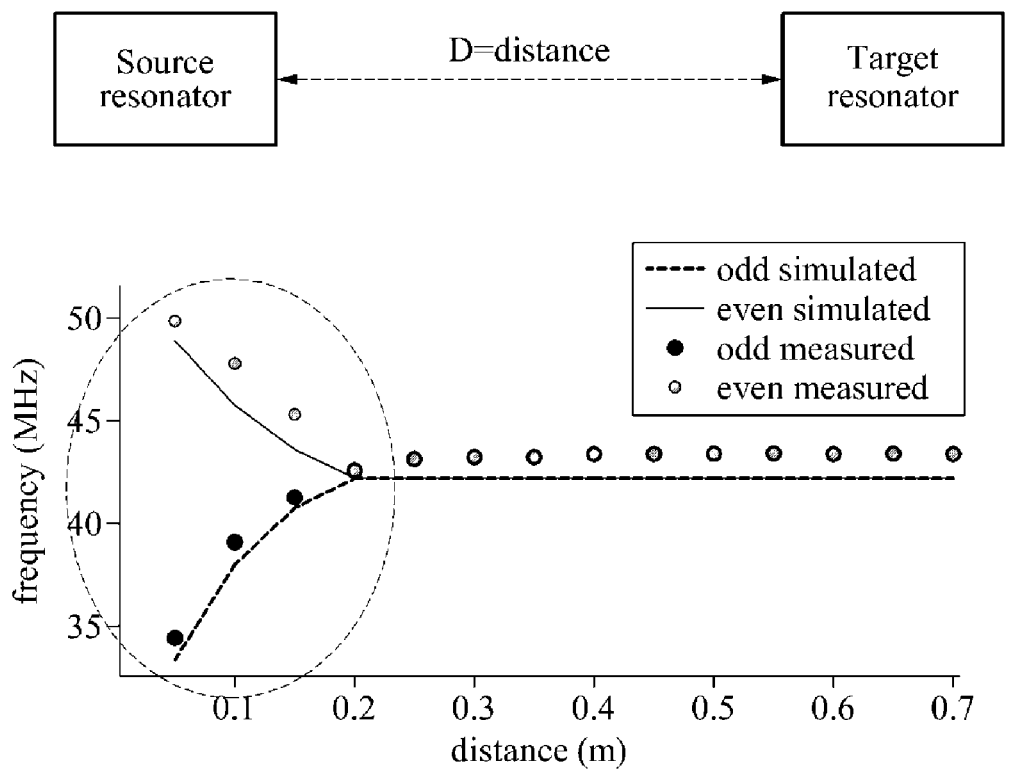
FIG. 19 is a diagram illustrating a change in a resonance frequency based on a distance between a source resonator and a target resonator in a wireless power transmitter.

FIG. 19 illustrates a change in a resonance frequency based on a distance between a source resonator and a target resonator in a wireless power transmitter.

When a distance between the source resonator and the target resonator is within about 0.2 m, the resonance frequency in an odd mode of a radio frequency (RF) area and the resonance frequency in an even mode of the RF area may be different from each other. Therefore, as the distance between the source resonator and the target resonator become closer within the 0.2 m distance, a change in a resonance frequency may increase.

The resonance frequency may be calculated based on the following equation:

$$\omega = \frac{\omega_1 + \omega_2}{2} \pm \sqrt{\left(\frac{\omega_1 - \omega_2}{2}\right)^2 + k^2}.$$

Here, $\omega_1$ denotes a resonance frequency of the source resonator, $\omega_2$ denotes a resonance frequency of the target resonator, and k denotes a coupling factor. The coupling factors may affect the calculation of the resonance frequency. Therefore, the distance between the source resonator and the target resonator may affect the coupling factor.

Figure 20:
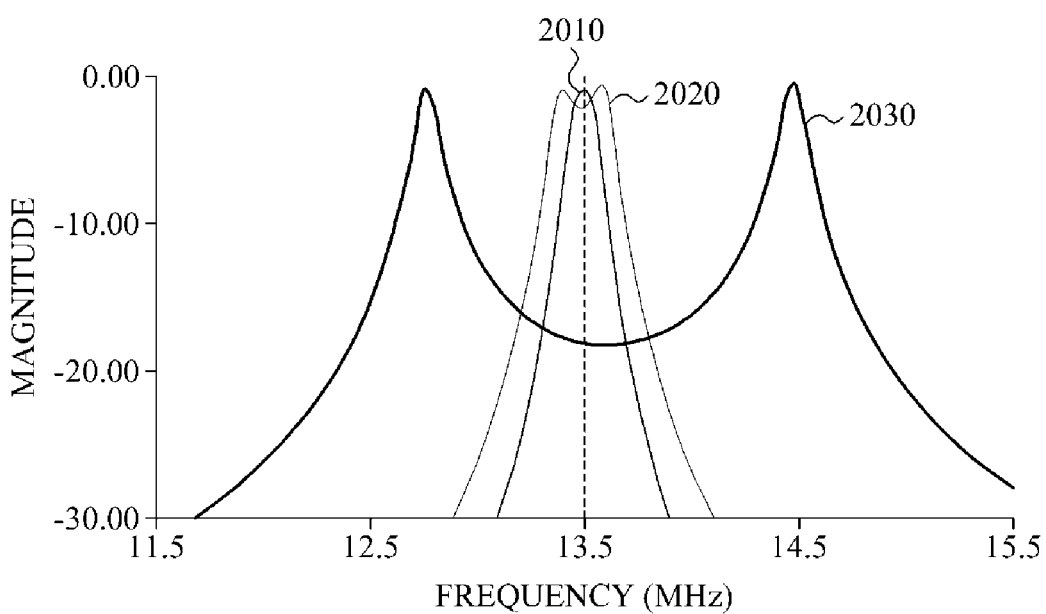
FIG. 20 is a graph illustrating a change in a resonance frequency based on a change of coupling factors.

FIG. 20 illustrates a change in a resonance frequency based on a change of coupling factors.

Referring to FIG. 20, a resonance frequency 2010 corresponds to a resonance frequency before a coupling factor k is changed. A resonance frequency 2020 and a resonance frequency 2030 correspond to resonance frequencies that vary based on the change of the coupling factor k. The resonance frequency may vary when a coupled mode center frequency is divided into an odd mode and an even mode based on a coupling rate. The coupling rate is based on a change in a distance between a source resonator and a target resonator, and a change in a location of the target resonator on the source resonator. The change in the distance between the source resonator and the target resonator and the change in the location of the target resonator on the source resonator may be element affecting the coupling factor.

A wireless power transmitter may detect a varying resonance frequency between the source resonator and the target resonator, may control a frequency in a coupling band at regular time intervals, may detect wireless power transmission efficiency in the varying resonance frequency, and may select a resonance frequency having optimal wireless power transmission efficiency as a power transmission frequency.

Figure 21:
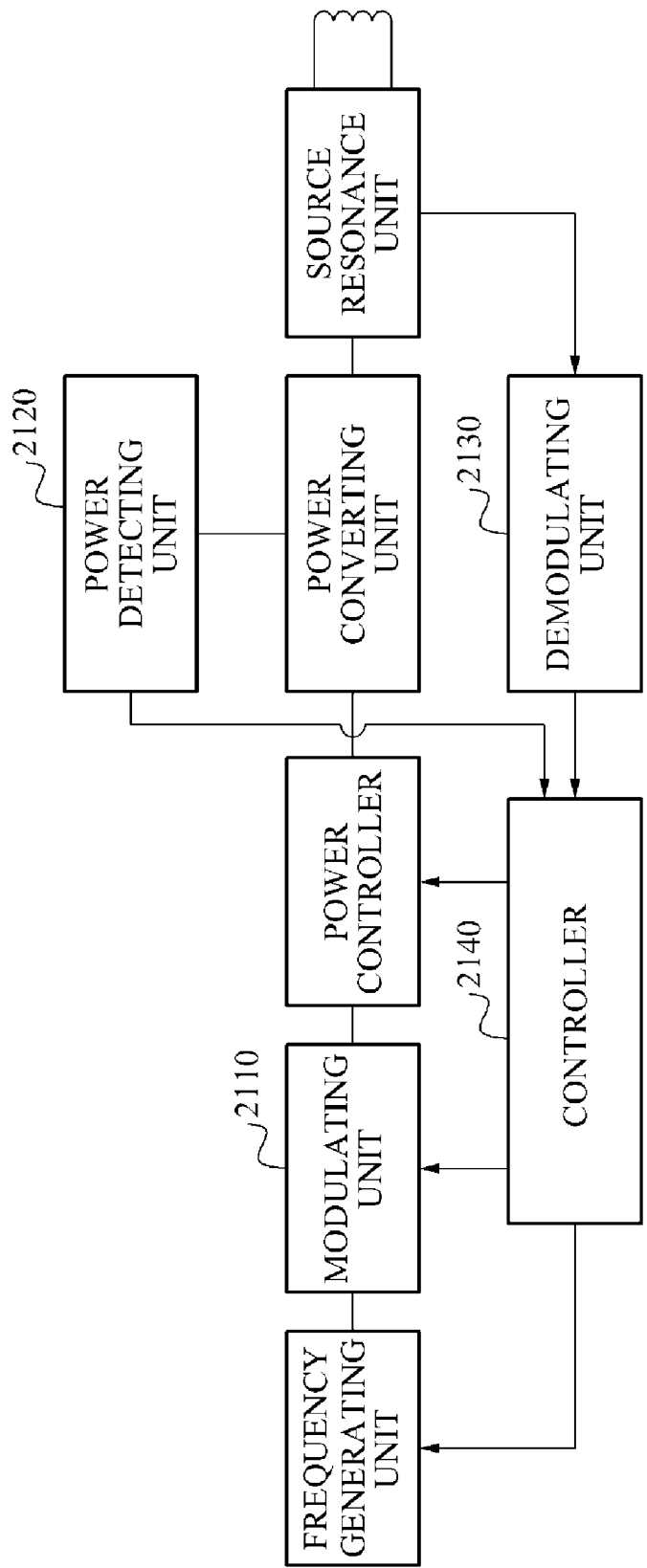
FIG. 21 is a block diagram illustrating another wireless power transmitter.

FIG. 21 illustrates another wireless power transmitter.

The wireless power transmitter may be configured to obtain information associated with power transmitted from a source resonator and power received by a target resonator, based on an in-band communication scheme, and may calculate wireless power transmission efficiency. The in-band communication scheme may perform communication using a resonance frequency between the source resonator and the target resonator.

A modulating unit 2110 may modulate data to be transmitted to a wireless power receiver. For example, the modulating unit 2110 may modulate data using a pulse signal provided from a controller 2140. The data to be transmitted to the wireless power receiver may include a signal requesting information associated with received power, information associated with a frequency set between the source resonator and the target resonator, and information associated with transmitted power.

A power detecting unit 2120 may detect power supplied to a power converting unit. The detected power may be used for calculating the transmitted power outputted from the wireless power transmitter.

A demodulating unit 2130 may demodulate data received from the wireless power receiver. The data received from the wireless power receiver may include information associated with power received by the target resonator, an ID of the wireless power receiver, an ID of the target resonator, state information associated with the wireless power receiver, and the like.

The controller 2140 may calculate the wireless power transmission efficiency, based on the transmitted power of the wireless power transmitter and the received power of the wireless power receiver. The controller 2140 may control a frequency in a coupling band at regular time intervals, so as to increase the wireless power transmission efficiency. A frequency generating unit may generate a frequency based on a control signal of the controller 2140.

Figure 22:
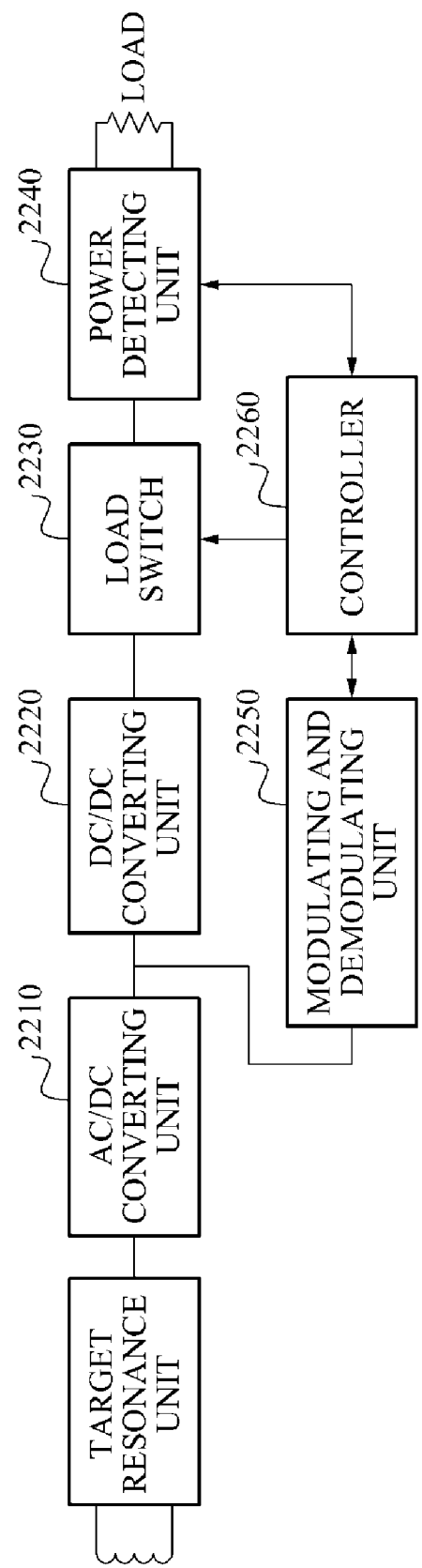
FIG. 22 is a block diagram illustrating another wireless power receiver.

FIG. 22 illustrates another wireless power receiver.

Referring to FIG. 22, the wireless power receiver may use an in-band communication scheme in response to the wireless power transmitter of FIG. 21.

An AC/DC converting unit 2210 may convert AC power received by a target resonator to a DC signal. The AC/DC converting unit 2210 may include a rectifier, an adjuster, a linear converter and a switching converter. A DC/DC converting unit 2220 may convert the DC signal to an energy level appropriate for a load. For example, the DC signal may be converted to a rated voltage appropriate for the load.

The load switch 2230 may block transferred power when the load is completely charged with power. The power detecting unit 2240 may detect received power transferred to the load.

A modulating and demodulating unit 2250 may demodulate data received from the wireless power transmitter, and may modulate data transmitted from the wireless power receiver. The data received from the wireless power transmitter may include a signal that requests information associated with the received power, information associated with a frequency set between the source resonator and the target resonator, and information associated with transmitted power. The data transmitted from the wireless power receiver may include information associated with the received power detected by the power detecting unit 2240, an ID of the wireless power receiver, an ID of a target resonator, and state information associated with the wireless power receiver, and/or the like.

The controller 2260 may control the modulating and demodulating unit 2250 to modulate information associated with the detected received power and to transmit the modulated information to the wireless power transmitter, and may control a load switch 2230 and the DC/DC converting unit 2220 based on power required for the load and whether the load is completely charged.

Figure 23:
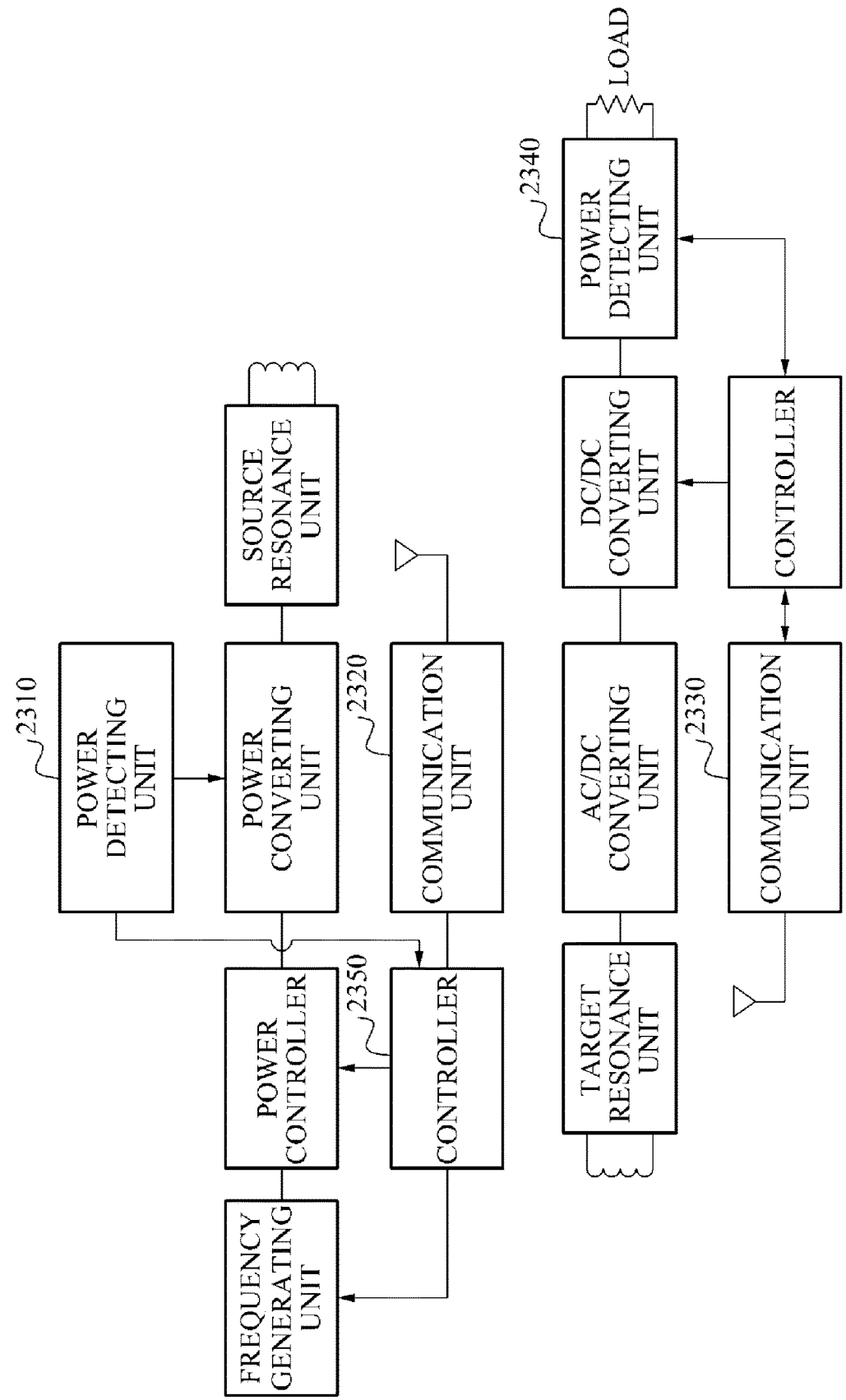
FIG. 23 is a block diagram illustrating a wireless power transmission and reception system.

FIG. 23 illustrates a wireless power transmission and reception system.

In the wireless power transmission and reception system, a wireless power transmitter may obtain information associated with power transmitted from a source resonator and power received by a target resonator using an out-band communication scheme, and may calculate wireless power transmission efficiency. The out-band communication scheme may perform communication using a frequency as opposed to a resonance frequency between the source resonator and the target resonator.

The power detecting unit 2310 may detect power supplied to a power converting unit. The detected power may be used for calculating transmitted power outputted from the wireless power transmitter. A communication unit 2320 may perform out-band communication with a communication unit 2330 of a wireless power receiver to receive information associated with received power of the wireless power receiver. The controller 2350 may calculate the wireless power transmission efficiency, based on the transmitted power of the wireless power transmitter and the received power of the wireless power receiver. The controller 2350 may control a frequency in a coupling band at regular time intervals to increase the wireless power transmission efficiency. The frequency generating unit may generate a frequency based on a control signal of the controller 2350. The power detecting unit 2340 may detect the power received by the wireless power receiver. The communication unit 2330 may transmit information associated with the received power to the communication unit 2320, based on an out-band communication scheme.

Figure 24:
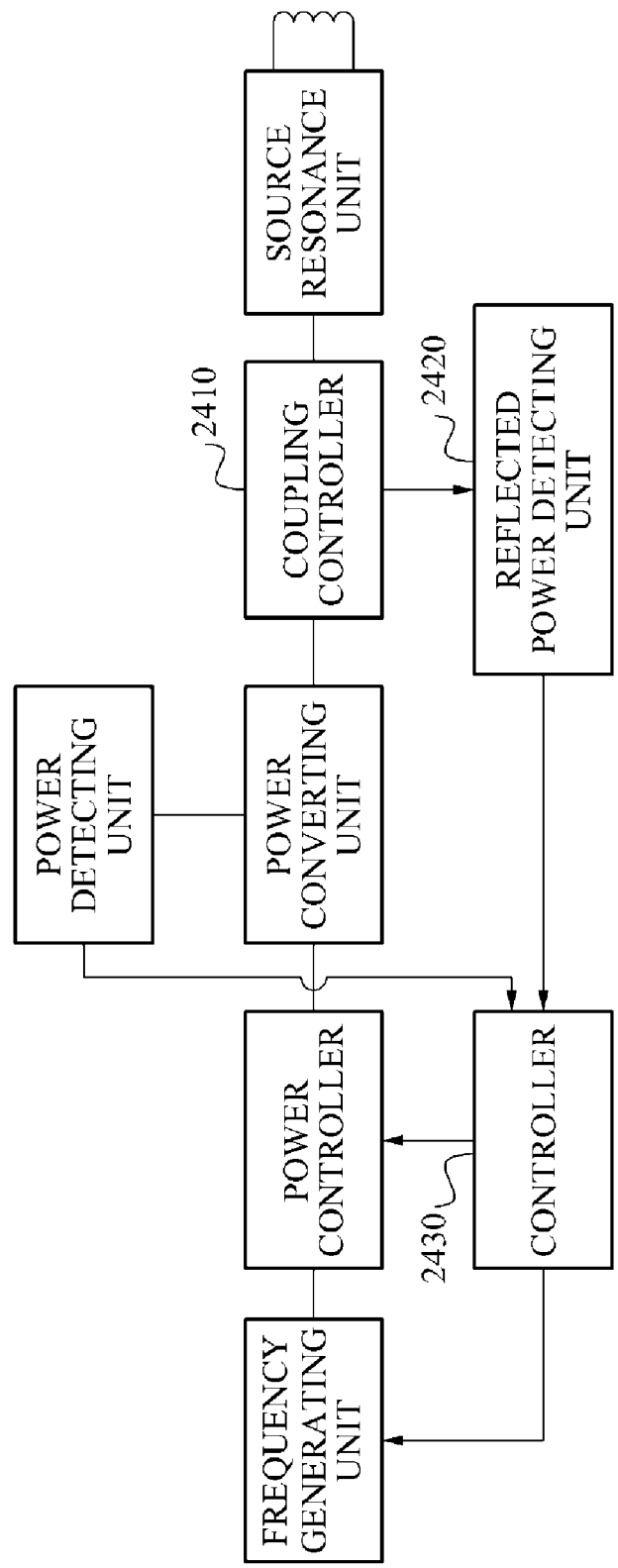
FIG. 24 is a block diagram illustrating still another wireless power transmitter.

FIG. 24 illustrates still another wireless power transmitter.

Referring to FIG. 24, the wireless power transmitter may obtain information associated with power transmitted from a source resonator and power reflected from a target resonator, and may calculate wireless power transmission efficiency.

The wireless power transmitter and a wireless power receive may transmit and receive wireless power through an impedance matching. A change in the impedance matching (or impedance mismatching) may occur due to various factors. For example, when the impedance mismatching occurs, the power transmitted from the wireless power transmitter may be reflected from the wireless power receiver.

The coupling controller 2410 may control a reflected power detecting unit 2420 to detect the reflected power among the transmitted power from the source resonator and the reflected power received by the source resonator. The reflected power detecting unit 2420 may detect the reflected power by removing the transmitted power transferred from a power converting unit to the source resonator from a signal including the transmitted power and the reflected power. For example, the reflected power detecting unit 2420 may detect the signal of the source resonator by a coupling, or may detect the transmitted power transferred from the power converting unit to the source resonator by a coupling.

The controller 2410 may calculate wireless power transmission efficiency based on the transmitted power detected by the power detecting unit and the reflected power detected by the reflected power detecting unit 2420. The controller 2410 may control a frequency in a coupling band based on regular time intervals to increase the wireless power transmission efficiency. The frequency generating unit may generate a frequency based on a control signal of the controller 2410.

Figure 25:
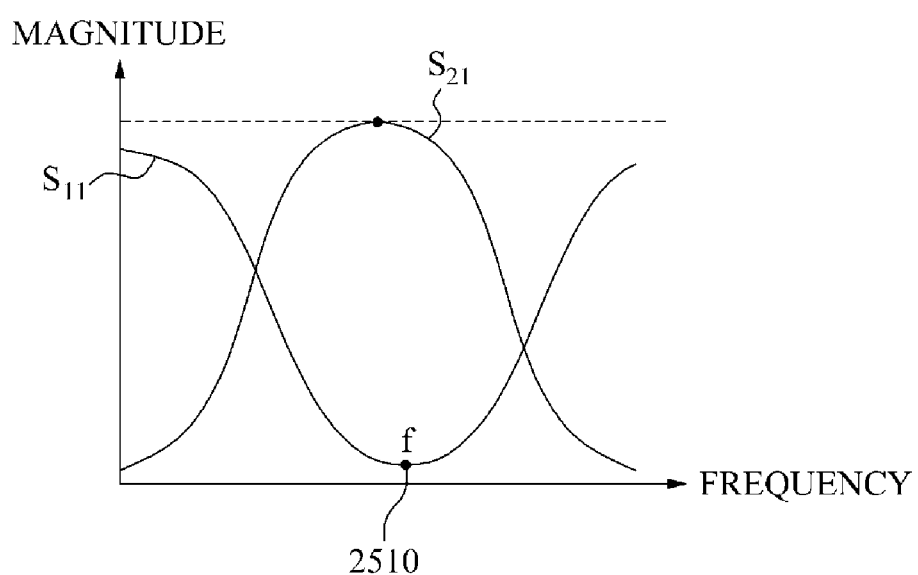
FIG. 25 is a graph illustrating wireless power transmission efficiency and a magnitude of reflected power in another wireless power transmission and reception system.

FIG. 25 illustrates wireless power transmission efficiency and a magnitude of reflected power for another wireless power transmission and reception system.

A curve $S_{21}$ indicates wireless power transmission efficiency in the wireless power transmission and reception system and a curve $S_{11}$ indicates a magnitude of reflected power in the wireless power transmission and reception system. A controller 2430 may determine an optimal resonance frequency between a frequency having maximum wireless power transmission efficiency and a frequency 2510 having a minimum magnitude of the reflected power.

Figure 26:
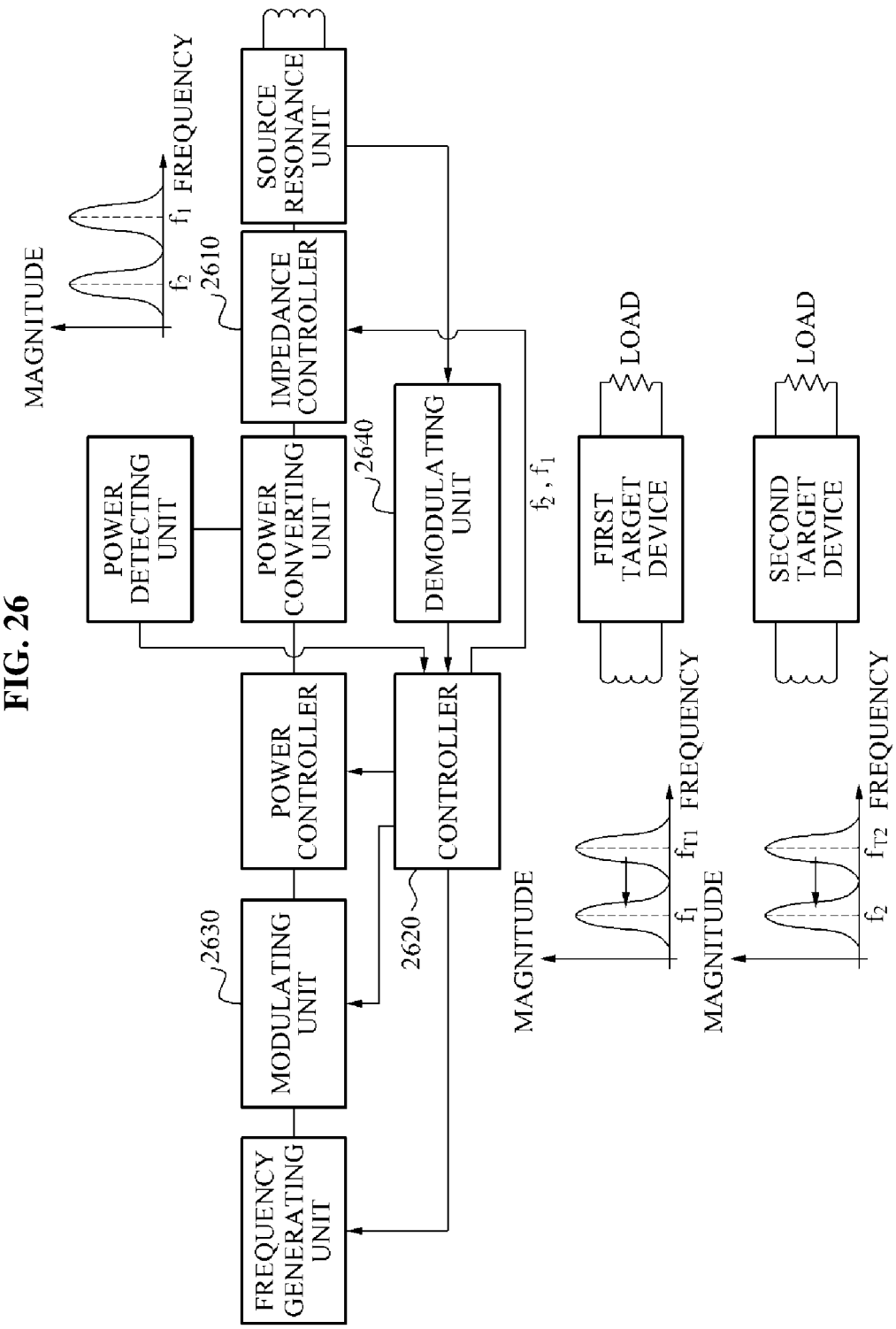
FIG. 26 is a block diagram illustrating yet another wireless power transmitter.

FIG. 26 illustrates yet another wireless power transmitter.

The wireless power transmitter may control resonance impedance between a source resonator and a target resonator to change a resonance frequency. For example, the wireless power transmitter may use information associated with wireless power transmission efficiency to determine the resonance frequency. The wireless power transmitter may obtain information associated with received power of the wireless power receiver, using an in-band communication scheme or an out-band communication scheme. The wireless power transmitter may detect power reflected from the wireless power receiver.

The impedance controller 2610 may control, based on a control of a controller 2620, an impedance of the wireless power transmitter. For example, the impedance controller 2610 may control an impedance of the wireless power transmitter, to change a resonance frequency between the source resonator and a first target device from $f_{T1}$ to $f_1$. The impedance controller 2610 may control the impedance of the wireless power transmitter to change a resonance frequency between the source resonator and a second target device from $f_{T2}$ to $f_2$. For example, the impedance controller 2610 may adjust a time for changing the resonance frequency $f_1$ and $f_2$, so as to control power to be transferred to the first target device and the second target device.

The controller 2620 may calculate wireless power transmission efficiency, based on transmitted power detected by a power detecting unit and information associated with received power of the wireless power receiver demodulated by the demodulating unit 2640. The controller 2620 may calculate the wireless power transmission efficiency, based on the transmitted power and the information associated with received power obtained through out-band communication. The controller 2620 may be configured to calculate the wireless power transmission efficiency, based on the transmitted power and reflected power detected by a reflected power detecting unit, for instance.

The controller 2620 may control an impedance controller 2610 to increase the wireless power transmission efficiency.

The modulating unit 2630 may modulate data to be transmitted to the wireless power receiver. The data to be transmitted to the wireless power receiver may include a signal requesting the wireless power receiver information associated with received power and information associated with transmitted power.

The demodulating unit 2640 may demodulate data received from the wireless power receiver. The data received from the wireless power receiver may include information associated with power received by a target resonator, an ID of the wireless power receiver, an ID of the target resonator, state information associated with wireless power receiver, and/or the like.

Figure 27:
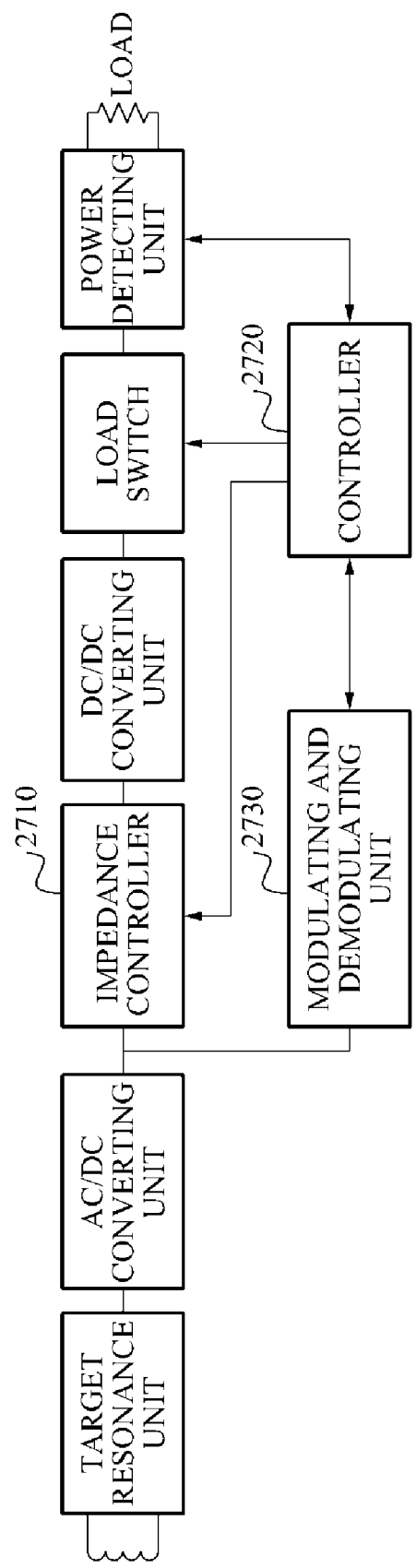
FIG. 27 is a block diagram illustrating still another wireless power receiver.

FIG. 27 illustrates still another wireless power receiver.

The wireless power receiver may control resonance impedance between a source resonator and a target resonator to change a resonance frequency. For example, the wireless power receiver may use information associated with wireless power transmission efficiency to determine the resonance frequency. The wireless power receiver may obtain information associate with reflected power and transmitted power of a wireless power transmitter, based on an in-band communication scheme or an out-band communication scheme.

An impedance controller 2710 may control, based on a control of a controller 2720, an impedance of the wireless power receiver to match the resonance frequency between the source resonator and the target device.

The controller 2720 may calculate the wireless power transmission efficiency, based on received power detected by a power detecting unit and information associated with transmitted power of the wireless power transmitter demodulated by a modulating and demodulating unit 2730. The controller 2720 may calculate the wireless power transmission efficiency, based on the received power and the information associated with the transmitted power obtained through an out-band communication. The controller 2720 may calculate the wireless power transmission efficiency, based on the transmitted power and reflected power obtained through in-band communication or an out-band communication.

The controller 2720 may control the impedance controller 2710 to increase the wireless power transmission efficiency.

The modulating and demodulating unit 2730 may modulate data to be transmitted to the wireless power transmitter. The data to be transmitted may include a signal requesting information associated with transmitted power from the wireless power transmitter, and information associated with received power. The modulating and demodulating unit 2730 may demodulate data received from the wireless power transmitter. The data received from the wireless power transmitter may include information associated with a frequency set between the source resonator and the target resonator, and information associated with the transmitted power.

The units described herein may be implemented using hardware components and/or software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless power transmitter comprising:
a transmitting unit configured to transmit wireless power; and
a controller configured to:
control to detect a target device and obtain state information of the detected target device,
assign a duty cycle to the detected target device, and
control the transmitting unit to transmit wireless power to the target device based on the duty cycle,
wherein the controller is further configured to control an amount of the wireless power by adjusting the duty cycle based on the obtained state information of the detected target device.

2. The wireless power transmitter of claim 1, wherein the duty cycle corresponds to a transmission period of the wireless power.

3. The wireless power transmitter of claim 1, further comprising a communication unit configured to receive the state information from the detected target device, the state information generated based on wireless power received by the detected target device.

4. The wireless power transmitter of claim 1, wherein the state information comprises at least one of wireless power received by the detected target device, a charging level of the detected target device, a power demand of the detected target device and a load of the detected target device.

5. The wireless power transmitter of claim 1, further comprising a detecting unit configured to detect the target device.

6. The wireless power transmitter of claim 1, wherein the controller is further configured to calculate wireless power transmission efficiency based on the wireless power transmitted from the transmitting unit and wireless power received by the detected target device.

7. The wireless power transmitter of claim 1, wherein the controller is further configured to calculate wireless power transmission efficiency based on the wireless power transmitted from the transmitting unit and reflected power from the detected target device.

8. The wireless power transmitter of claim 1, wherein the transmitting unit is further configured to transmit wake-up power to the target device, and
the wireless power transmitter further comprises a communication unit configured to receive, from the target device, a response signal corresponding to the wake-up power, the response signal used to detect the target device.

9. The wireless power transmitter of claim 1, further comprising a communication unit configured to receive, from the detected target device, an identification (ID) of the detected target device, the ID used to identify the detected target device.

10. The wireless power transmitter of claim 1, further comprising a power converting unit configured to convert DC power of a predetermined level to AC power for the wireless power based on a predetermined switching pulse signal.

11. The wireless power transmitter of claim 1, wherein the transmitting unit is further configured to sequentially transmit wireless power to detected target devices.

12. A wireless power receiver comprising:
a receiving unit configured to receive wireless power from a wireless power transmitter; and
a communication unit configured to transmit state information to the wireless power transmitter, based on the received wireless power,
wherein the receiving unit receives the wireless power during a duty cycle assigned to the wireless power receiver, and
wherein an amount of the wireless power is controlled based on an adjustment of the duty cycle according to the state information.

13. The wireless power receiver of claim 12, wherein the receiving unit is further configured to receive a wake-up power from the wireless power transmitter; and
the wireless power receiver further comprises a communication unit configured to transmit a response signal corresponding to the wake-up power.

14. The wireless power receiver of claim 12, further comprising a communication unit configured to transmit an identification (ID) of the wireless power receiver.

15. A wireless power transmission method, the method comprising:
detecting a target device;
obtaining state of information of the detected target device;
assigning a duty cycle to the detected target device;
transmitting wireless power to the detected target device based on the duty cycle; and
controlling an amount of the wireless power by adjusting the duty cycle based on the obtained state information of the detected target device.

16. The wireless power transmitter of claim 15, wherein the duty cycle corresponds to a transmission period of the wireless power.

17. The wireless power transmitter of claim 15, wherein the state information comprises at least one of wireless power received by the detected target device, a charging level of the detected target device, a power demand of the detected target device and a load of the detected target device.

18. The wireless power transmitter of claim 15, further comprising receiving the state information from the detected target device, the state information generated based on wireless power received by the detected target device.

19. A wireless power reception method, the method comprising:
receiving wireless power from a wireless power transmitter; and
transmitting state information to the wireless power transmitter, based on the received wireless power,
wherein the wireless power is received during a duty cycle assigned to the wireless power receiver, and
wherein an amount of the wireless power is controlled based on an adjustment of the duty cycle according to the state information.

20. The wireless power transmitter of claim 19, further comprising:
  receiving a wake-up power from the wireless power transmitter; and
  transmit a response signal corresponding to the wake-up power.

* * * * *